(12) United States Patent
Kang et al.

(10) Patent No.: US 9,947,322 B2
(45) Date of Patent: Apr. 17, 2018

(54) SYSTEMS AND METHODS FOR AUTOMATED EVALUATION OF HUMAN SPEECH

(71) Applicant: Arizona Board of Regents, Flagstaff, AZ (US)

(72) Inventors: Okim Kang, Flagstaff, AZ (US); David O. Johnson, Flagstaff, AZ (US)

(73) Assignee: Arizona Board of Regents Acting for and on Behalf of Northern Arizona University, Flagstaff, AZ (US)

( * ) Notice: Subject to any disclaimer, the term of this patent is extended or adjusted under 35 U.S.C. 154(b) by 24 days.

(21) Appl. No.: 15/054,128

(22) Filed: Feb. 25, 2016

(65) Prior Publication Data
US 2016/0253999 A1 Sep. 1, 2016

Related U.S. Application Data

(60) Provisional application No. 62/121,220, filed on Feb. 26, 2015.

(51) Int. Cl.
*G09B 19/04* (2006.01)
*G09B 19/06* (2006.01)
(Continued)

(52) U.S. Cl.
CPC ............ *G10L 17/005* (2013.01); *G09B 19/04* (2013.01); *G10L 25/60* (2013.01); *G10L 25/75* (2013.01);
(Continued)

(58) Field of Classification Search
CPC .......... G10L 25/60; G09B 19/04; G09B 19/06
See application file for complete search history.

(56) References Cited

U.S. PATENT DOCUMENTS

| 5,870,709 A | * | 2/1999 | Bernstein | ............... G09B 7/04 434/156 |
| 6,055,498 A | | 4/2000 | Neumeyer et al. | |

(Continued)

FOREIGN PATENT DOCUMENTS

JP 2012073280 A 4/2012

OTHER PUBLICATIONS

Dikli, "An Overview of Automated Scoring of Essays", The Journal of Technology, Learning, and Assessment, vol. 5, Aug. 2006.*

(Continued)

*Primary Examiner* — Jialong He
(74) *Attorney, Agent, or Firm* — IPTech Law

(57) ABSTRACT

Systems and methods for evaluating human speech. Implementations may include: a microphone coupled with a computing device comprising a microprocessor, a memory, and a display operatively coupled together. The microphone may be configured to receive an audible unconstrained speech utterance from a user whose proficiency in a language is being tested and provide a corresponding audio signal to the computing device. The microprocessor and memory may receive the audio signal and process the audio signal by recognizing a plurality of phones and a plurality of pauses and calculate a plurality of suprasegmental parameters using the plurality of pauses and the plurality of phones. The microprocessor and memory may use the plurality of suprasegmental parameters to calculate a language proficiency rating for the user and display the language proficiency rating of the user on the display associated with the computing device.

20 Claims, 13 Drawing Sheets

(51) Int. Cl.
G10L 17/06 (2013.01)
G10L 17/00 (2013.01)
G10L 25/75 (2013.01)
G10L 25/60 (2013.01)
G10L 25/87 (2013.01)
G10L 15/02 (2006.01)
G10L 15/00 (2013.01)

(52) U.S. Cl.
CPC .............. *G10L 15/00* (2013.01); *G10L 25/87* (2013.01); *G10L 2015/025* (2013.01); *G10L 2015/027* (2013.01)

(56) References Cited

U.S. PATENT DOCUMENTS

| | | | |
|---|---|---|---|
| 6,484,010 B1* | 11/2002 | Sheehan | G09B 7/02 434/118 |
| 7,062,441 B1* | 6/2006 | Townshend | G09B 19/04 434/353 |
| 7,840,404 B2 | 11/2010 | Xi et al. | |
| 8,226,416 B2 | 7/2012 | Abrash et al. | |
| 8,457,967 B2 | 6/2013 | Audhkhasi et al. | |
| 8,494,857 B2 | 7/2013 | Pakhomov | |
| 2004/0049391 A1 | 3/2004 | Polanyi et al. | |
| 2007/0033017 A1* | 2/2007 | Nair | G09B 5/00 704/219 |
| 2010/0004931 A1 | 1/2010 | Ma et al. | |
| 2011/0213610 A1 | 9/2011 | Chen et al. | |
| 2011/0270605 A1 | 11/2011 | Qin et al. | |
| 2012/0016672 A1* | 1/2012 | Chen | G10L 25/60 704/236 |
| 2012/0245942 A1 | 9/2012 | Zechner et al. | |
| 2012/0323573 A1* | 12/2012 | Yoon | G09B 19/06 704/236 |
| 2013/0030808 A1* | 1/2013 | Zechner | G10L 25/60 704/236 |
| 2014/0195239 A1* | 7/2014 | Evanini | G10L 25/60 704/254 |
| 2014/0297277 A1 | 10/2014 | Zechner et al. | |
| 2015/0058013 A1 | 2/2015 | Pakhomov et al. | |

OTHER PUBLICATIONS

Zechner, Klaus, and Isaac I. Bejar. "Towards automatic scoring of non-native spontaneous speech." Proceedings of the main conference on human language technology conference of the North American chapter of the association of computational linguistics. Association for Computational Linguistics, 2006.*
Weigle, "English language learners and automated scoring of essays: Critical considerations", Assessing Writing 18 (2013) 85-99.*
Kang et al. "The role of objective measures of suprasegmental features in judgments of comprehensibility and oral proficiency in L2 spoken discourse", 2011.*
Okim Kang, "Relative salience of suprasegmental features on judgments of L2 comprehensibility and accentedness," System, vol. 38, pp. 301-315, Elsevier/ScienceDirect, (2010).
Rodolfo Delmonte, "SLIM prosodic automatic tools for self-learning instruction," Speech Communication, vol. 30, pp. 145-166, Elsevier, (2000).
Horacio Franco et al., "EduSpeak: A speech recognition and pronunciation scoring toolkit for computer-aided language learning applications," Language Testing, vol. 27, issue 3, pp. 401-418, (2010).
Catia Cucchiarini, "Towards an Automatic Oral Proficiency Test for Dutch as a Second Language: Automatic Pronunciation Assessment in Read and Spontaneous Speech," Proceedings InStiLL, Dundee, University of Nijmegen, The Netherlands, (2000).
Klaus Zechner et al., "Automated Scoring of Speaking Tasks in the Test of English-for-Teaching (TEFT)," ETS Research Report Series, (2015).
Leonardo Neumeyer et al., "Automatic scoring of pronunciation quality," Speech Communication, vol. 30, pp. 83-93, Elsevier, (2000).
Keelan Evanini et al., "Automated speech scoring for non-native middle school students with multiple task types," INTERSPEECH, pp. 2435-2439, (2013).
O. Kang, "Relative impact of pronunciation features on ratings of non-native speakers' oral proficiency," J. Levis & K. Levelle (Eds.), Proceedings of the 4th Pronunciation in Second Language Learning and Teaching Conference, pp. 10-15, Ames, Iowa, (Aug. 2012).
Daniel Povey et al., "The Kaldi Speech Recognition Toolkit," Proceedings of 2011 IEEE Workshop on Automatic Speech Recognition & Understanding (ASRU), (Dec. 11-15, 2011).
Abhijeet Sangwan et al., "Automatic analysis of Mandarin accented English using phonological features," Speech Communication, vol. 54, pp. 40-54, Elsevier/ScienceDirect, (2012).
"Pearson Announces Revolutionary Tablet-Based Interactive Assessment for English Language Learners at FETC 2015," (published online by pearsoned.com at least as early as Jan. 21, 2015).
Okim Kang et al., "Impact of different task types on candidates' speaking performances and interactive features that distinguish between CEFR levels," Cambridge English: Research Notes, issue 57, pp. 40-49, (Aug. 2014).
Okim Kang et al., "Suprasegmental Measures of Accentedness and Judgments of Language Learner Proficiency in Oral English," The Modern Language Journal, vol. 94, issue 4, (2010).
Klaus Zechner, "Automatic scoring of non-native spontaneous speech in tests of spoken English," Speech Communication, vol. 51, issue 10, pp. 883-895, Elsevier, (Oct. 2009).
Klaus Zechner et al., "Towards Automatic Scoring of Non-Native Spontaneous Speech," Proceedings of the Human Language Technology Conference of the North American Chapter of the Association for Computational Linguistics (ACL), pp. 216-223, New York, Jun. 2006.
Colin W. Wightman et al., "Automatic Labeling of Prosodic Patterns," IEEE Transactions on Speech and Audio Processing, Oct. 1994.
Natsumi Sawai et al., "Estimation of Emotion in Speech Based on Prosodic," Proceedings of the 2007 IEICE General Conference, 2007.

* cited by examiner

SYSTEMS AND METHODS FOR AUTOMATED EVALUATION OF HUMAN SPEECH

CROSS REFERENCE TO RELATED APPLICATIONS

This document claims the benefit of the filing date of U.S. Provisional Patent Application 62/121,220, entitled "Systems and Methods for Prosody Detection of Human Speech" to Kang et al. (the "'220 Provisional") which was filed on Feb. 26, 2015, the disclosure of which is hereby incorporated entirely herein by reference.

BACKGROUND

1. Technical Field

Aspects of this document relate generally to systems and methods for evaluating characteristics of human speech, such as prosody, fluency, and proficiency.

2. Background

Those learning a second language often undergo proficiency examinations or tests performed by human evaluators. These examinations are intended to allow the speech of the learner to be assessed and, in some systems, scored by the human evaluator using various criteria, such as fluency, to determine the learner's proficiency. An example of a conventional test used for assessment is the Test of English as a Second Language (TOEFL) administered by Education Testing Service (ETS) of Princeton, N.J.

SUMMARY

Implementations of a system for performing automated proficiency scoring of speech may include: a microphone coupled with a computing device comprising a microprocessor, a memory, and a display operatively coupled together. The microphone may be configured to receive an audible unconstrained speech utterance from a user whose proficiency in a language is being tested and provide a corresponding audio single to the computing device. The microprocessor and memory may be configured to receive the audio signal and process the audio signal by recognizing a plurality of phones and a plurality of pauses included in the audio signal corresponding with the utterance. They may also be configured to divide the plurality of phones and plurality of pauses into a plurality of tone units, grouping the plurality of phones into a plurality of syllables, and identify a plurality of filled pauses from among the plurality of pauses. They may also be configured to detect a plurality of prominent syllables from among the plurality of syllables, identify, from the among the plurality of prominent syllables, a plurality of tonic syllables, and identify a tone choice for each of the tonic syllables of the plurality of tonic syllables to form a plurality of tone choices. They also may be configured to calculate a relative pitch for each of the tonic syllables of the plurality of tonic syllables to form a plurality of relative pitch values, and calculate a plurality of suprasegmental parameters using the plurality of pauses, the plurality of tone units, the plurality of syllables, the plurality of prominent syllables, the plurality of tone choices, and the plurality of relative pitch values. They may also be configured to use the plurality of suprasegmental parameters to calculate a language proficiency rating for the user and display the language proficiency rating of the user on the display associated with the computing device using the microprocessor and the memory.

Implementations of a system for performing automated proficiency scoring of speech may include one, all, or any of the following:

Recognizing a plurality of phones and a plurality of pauses may further include recognizing using an automatic speech recognition system (ASR) and the microprocessor wherein the ASR is trained using a speech corpus.

The system may further be configured to identify a plurality of silent pauses of the plurality of pauses after recognizing using the ASR.

Dividing the plurality of phones and plurality of pauses into a plurality of tone units may further include using the plurality of silent pauses and one of a plurality of pitch resets and a plurality of slow pace values.

Grouping the plurality of phones into a plurality of syllables may further include using a predetermined bias value.

Detecting a plurality of prominent syllables from among the plurality of syllables may further include detecting using a bagging ensemble of decision tree learners, two or more speech corpora, and the microprocessor.

Identifying a tone choice for each of the tonic syllables may further include identifying using a rule-based classifier using a 4-point model, two or more speech corpora and the microprocessor.

The plurality of suprasegmental parameters may be selected from the group consisting of articulation rate (ARTI), phonation time ratio (PHTR), tone unit mean length (RNLN), syllables per second (SYPS), filled pause mean length (FPLN), filled pauses per second (FPRT), silent pause mean length (SPLN), silent pauses per second (SPRT), prominent syllables per tone unit (PACE), percent of tone units containing at least one prominent syllable (PCHR), percent of syllables that are prominent (SPAC), overall pitch range (PRAN), non-prominent syllable mean pitch (AVNP), prominent syllable mean pitch (AVPP), falling-high rate (FALH), falling-low rate (FALL), falling-mid rate (FALM), fall-rise-high rate (FRSH), fall-rise-low rate (FRSL), fall-rise-mid rate (FRSM), neutral-high rate (NEUH), neutral-low rate (NEUL), neutral-mid rate (NEUM), rise-fall-high rate (RFAH), rise-fall-low rate (RFAL), rise-fall-mid rate (RFAM), rising-high rate (RISH), rising-low rate (RISL), rising-mid rate (RISM), given lexical item mean pitch (GIVP), new lexical item mean pitch (NEWP), paratone boundary onset pitch mean height (OPTH), paratone boundaries per second (PARA), paratone boundary mean pause length (PPLN), paratone boundary mean termination pitch height (TPTH), and any combination thereof.

Calculating a language proficiency rating for the user may further include calculating using the plurality of suprasegmental parameters and a pairwise coupled ensemble of decision tree learners and the microprocessor.

The language may be English and the language proficiency rating may be based on a Cambridge English Language Assessment rating system.

Implementations of systems disclosed herein may utilize implementations of a method of performing automated proficiency scoring of speech. The method may include generating an audio signal using a microphone by receiving an audible unconstrained speech utterance from user whose proficiency in a language is being tested and providing the audio signal to a computing device coupled with the microphone, the computing device comprising a microprocessor, a memory, and a display operative coupled together. The method may also include processing the audio signal using the microprocessor and memory by recognizing a plurality of phones and a plurality of pauses included in the audio signal corresponding with the utterance, dividing the plurality of phones and plurality of pauses into a plurality of tone units, and grouping the plurality of phones into a plurality of syllables. The method may also include identifying a plurality of filled pauses from among the plurality of pauses, detecting a plurality of prominent syllables from among the plurality of syllables, and identifying, from among the plurality of prominent syllables, a plurality of tonic syllables. The method may also include identifying a tone choice for each of the tonic syllables of the plurality of tonic syllables to form a plurality of tone choice, calculating a relative pitch for each of the tonic syllables of the plurality of tonic syllables to form a plurality of relative pitch values, and calculating a plurality of a plurality of suprasegmental parameters using the plurality of pauses, the plurality of tone units, the plurality of syllables, the plurality of prominent syllables, the plurality of tone choices, and a plurality of relative pitch values. The method may also include using the plurality of suprasegmental parameters to calculate a language proficiency for the user and displaying the language proficiency rating of the user on the display associated with the computing device using the microprocessor and the memory.

Implementations of the method may include one, all, or any of the following:

Recognizing a plurality of phones and a plurality of pauses may further include recognizing using an automatic speech recognition system (ASR) and microprocessor wherein the ASR is trained used a speech corpus.

The method may include identifying a plurality of silent pauses of the plurality of pauses after recognizing using the ASR.

Dividing the plurality of phones and plurality of pauses into the plurality of tone units may further include using the plurality of silent pauses and a plurality of pitch resets or a plurality of slow pace values.

Detecting a plurality of prominent syllables from among the plurality of syllables may further include detecting using a bagging ensemble of decision tree learners, two or more speech corpora, and the microprocessor.

Identifying a tone choice for each of the tonic syllables may further include identifying using a rule-base classifier including a 4-point model, two or more speech corpora, and the microprocessor.

The plurality of suprasegmental parameters may be selected from the group consisting of articulation rate (ARTI), phonation time ratio (PHTR), tone unit mean length (RNLN), syllables per second (SYPS), filled pause mean length (FPLN), filled pauses per second (FPRT), silent pause mean length (SPLN), silent pauses per second (SPRT), prominent syllables per tone unit (PACE), percent of tone units containing at least one prominent syllable (PCHR), percent of syllables that are prominent (SPAC), overall pitch range (PRAN), non-prominent syllable mean pitch (AVNP), prominent syllable mean pitch (AVPP), falling-high rate (FALH), falling-low rate (FALL), falling-mid rate (FALM), fall-rise-high rate (FRSH), fall-rise-low rate (FRSL), fall-rise-mid rate (FRSM), neutral-high rate (NEUH), neutral-low rate (NEUL), neutral-mid rate (NEUM), rise-fall-high rate (RFAH), rise-fall-low rate (RFAL), rise-fall-mid rate (RFAM), rising-high rate (RISH), rising-low rate (RISL), rising-mid rate (RISM), given lexical item mean pitch (GIVP), new lexical item mean pitch (NEWP), paratone boundary onset pitch mean height (OPTH), paratone boundaries per second (PARA), paratone boundary mean pause length (PPLN), paratone boundary mean termination pitch height (TPTH), and any combination thereof.

Calculating a language proficiency rating for the user may further include calculating using the plurality of suprasegmental parameters and a pairwise coupled ensemble of decision tree learners and the microprocessor.

The language may be English and the language proficiency rating may be based on a Cambridge English Language Assessment rating system.

Implementations of systems disclosed herein may utilize implementations of a method of calculating a plurality of suprasegmental values for an utterance. The method may include generating an audio signal using a microphone by receiving an audible unconstrained speech utterance from a user and providing the audio signal to a computing device coupled with the microphone where the computing device may include a microprocessor, a memory, and a display operatively coupled together. The method may also include processing the audio signal using the microprocessor and memory by recognizing a plurality of phones and a plurality of pauses included in the audio signal corresponding with the utterance, dividing the plurality of phones and plurality of pauses into a plurality of tone units, and grouping the plurality of phones into a plurality of syllables. The method may include identifying a plurality of filled pauses from among the plurality of pauses, detecting a plurality of prominent syllables form among the plurality of syllables, and identifying, from among the plurality of prominent syllables, a plurality of tonic syllables. The method may also include identifying a tone choice for each of the tonic syllables of the plurality of tonic syllables to form a plurality of tone choices, calculating a relative pitch for each of the tonic syllables of the plurality of tonic syllables to form a plurality of relative pitch values, and calculating a plurality of suprasegmental parameters using the plurality of pauses, the plurality of tone units, the plurality of syllables, the plurality of prominent syllables, the plurality of tone choices, and a plurality of relative pitch values.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended automated human speech evaluation system and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such automated human speech evaluation system and related methods, and implementing components and methods, consistent with the intended operation and methods.

Detection of prosody in human speech is more than conventional automatic speech recognition (ASR). Automatic speech recognition is the translation of spoken words into text. Some conventional ASR systems use training where an individual speaker reads sections of text into the ASR system. These systems analyze the person's specific voice and use it to fine-tune the recognition of that person's speech, resulting in more accurate transcription. ASR applications include voice user interfaces such as voice dialing (e.g. "Call Betty"), call routing (e.g. "I would like to make a collect call"), domestic appliance control (e.g., "Turn the TV on"), search (e.g. "Find a song where particular words were sung"), simple data entry (e.g., entering a social security number), preparation of structured documents (e.g., medical transcription), speech-to-text processing (e.g., word processors or emails), and aircraft (usually termed Direct Voice Input). Conventional ASR technology recognizes speech by considering the most likely sequence of phones, phonemes, syllables, and words which are limited by a particular language's grammar and syntax.

Figure 2:
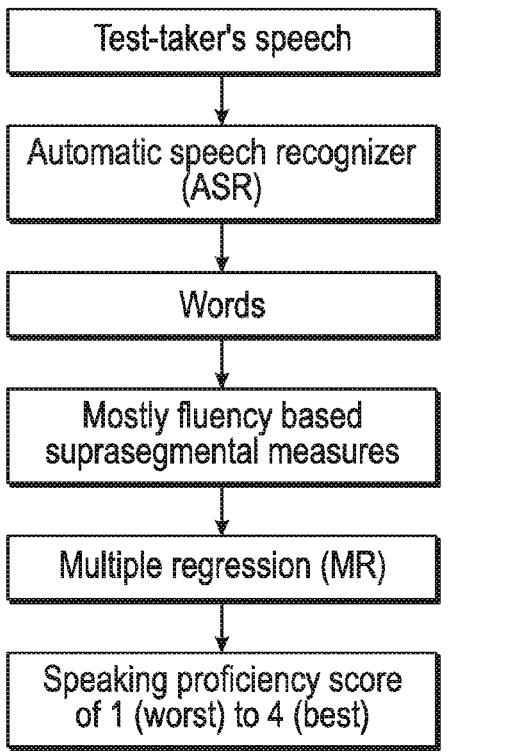
FIG. 2 is a flowchart of a process used by a conventional ASR system when calculating a language proficiency score.

Referring to FIG. 2, an example of a flowchart of the process used by a conventional ASR system is illustrated in the context of creating a proficiency score for assessing the proficiency of a user being tested. By inspection, the ASR system focuses on generating a set of words from the utterance and then identifying suprasegmental measures from the utterance that are chosen mostly based on language fluency. These measures are then used in a multiple regression process to generate a speaking proficiency score, which, as illustrated, may be a 1 to 4 score, worst to best.

The prosody of a speaker's speech, among other segmental features, is used by hearers to assess language proficiency. The incorrect use of prosody is what makes a non-native speaker, who knows the correct grammar and choice of vocabulary, to still be perceived by a native speaker to have an accent. A speaker's prosody may be assessed in two ways, 1) text dependent models and 2) text independent models. Conventional text dependent models use specifically prompted words, phrases, or sentences for assessment.

Figure 3:
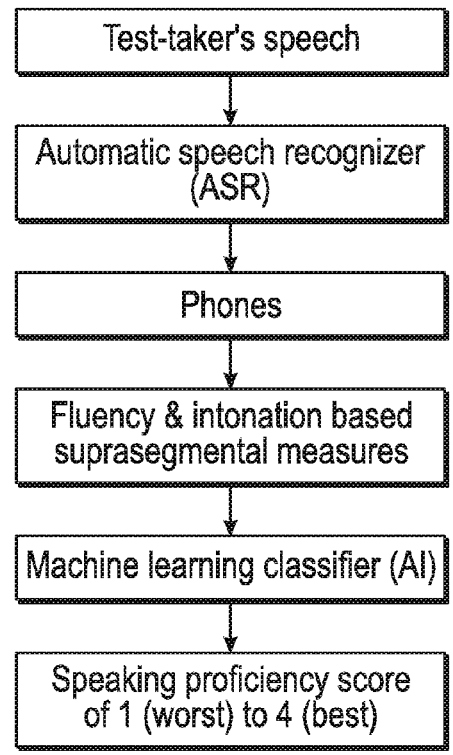
FIG. 3 is a flowchart of a process used by an implementation of a text independent system like those disclosed herein when calculating a language proficiency score.

Text independent models/systems, like those disclosed in this document, use unstructured monologues from the speaker during assessment. Where the systems can accurately use the prosody of the speech to improve recognition of the words spoken, the models created and used by the systems can also accurately assess and provide feedback to a non-native language speaker, such as through computer-aided language learning (CALL). Referring to FIG. 3, a flowchart of a process used in a text independent system is illustrated. By inspection, the ASR portion of the system focuses on generating a set of phones from the utterance from the speaker. The system then calculates and determines various fluency and intonation based suprasegmental measure from the set of phones. Then a machine learning classifier, a form of artificial intelligence, assesses the phones and the suprasegmental measures and calculates a speaking proficiency score on a 1-4 scale. As discussed herein, because the text independent system focuses on phones, it has the potential to more accurately assess the actual language proficiency of the speaker as it is able to focus on the prosody of the speech, rather than just the words themselves. Additional information on the differences between text dependent and text independent systems and methods may be found in the paper by Johnson et al., entitled "Language Proficiency Ratings: Human vs. Machine," filed herewith as APPENDIX G, the disclosure of which is hereby incorporated entirely herein by reference.

In linguistics, prosody is the rhythm, stress, and intonation of human speech. Prosody may reflect various features of the speaker or the utterance: the emotional state of the speaker, the form of the utterance (statement, question, or command), the presence of irony or sarcasm, emphasis, contrast, and focus, or other elements of language that may not be encoded by grammar or by choice of vocabulary. Prosodic features are often interchangeably used with suprasegmentals. They are not confined to any one segment, but occur in some higher level of an utterance. These prosodic units are the actual phonetic chunks of speech, or thought groups. They need not correspond to grammatical units such as phrases and clauses, though they may.

Prosodic units are marked by phonetic cues. Phonetic cues can include aspects of prosody such as pitch, length, intensity, or accents, all of which are cues that must be analyzed in context, or in comparison to other aspects of a sentence in a discourse. Pitch, for example, can change over the course of a sentence and it carries a different meaning. English speakers choose a rising tone on key syllables to reflect new (or unrelated) information. They choose falling or level tones to reflect given (or related) information, or a suspension of the current informational context. Each tone is also assigned a pragmatic meaning within the context of the discourse. Falling tones indicate a speaker telling something to a hearer, and rising tones indicate that the speaker is reminding the hearer of something or asking a question. The choice of tone on the focus word can affect both perceived information structure and social cues in discourse.

Pauses are an important feature that can be used to determine prosodic units because they can often indicate breaks in a thought and can also sometimes indicate the intended grouping of nouns in a list. Prosodic units, along with function words and punctuation, help to mark clause boundaries in speech. Accents, meanwhile, help to distinguish certain aspects of a sentence that may require more attention. English often utilizes a pitch accent, or an emphasis on the final word of a sentence. Focus accents serve to emphasize a word in a sentence that requires more attention, such as if that word specifically is intended to be a response to a question.

Presently, there are two principal analytical frameworks for representing prosodic features, either of which could be used in various system and method implementations: the British perspective, represented by Brazil, and the American perspective, represented by Pierrehumbert. David Brazil was the originator of discourse intonation, an intonational model which includes a grammar of intonation patterns and an explicit algorithm for calculating pitch contours in speech, as well as an account of intonational meaning in the discourse. His approach has influenced research, teacher training, and classroom practice around the world. Publications influenced by his work started appearing in the 1980s, and continue to appear. Janet Pierrehumbert developed an alternate intonational model, which has been widely influential in speech technology, psycholinguistics, and theories of language form and meaning.

In either framework, the smallest unit of prosodic analysis is the prominent syllable. Prominence is defined by three factors: pitch (fundamental frequency of a syllable in Hz), duration (length of the syllable in seconds), and loudness (amplitude of the syllable in dB). Importantly, prominence should be contrasted with word or lexical stress. Lexical stress focuses on the syllable within a particular content word that is stressed. However, prominence focuses on the use of stress to distinguish those words that carry more meaning, more emphasis, more contrast, in utterances. Thus, a syllable within a word that normally receives lexical stress may receive additional pitch, length, or loudness to distinguish meaning. Alternatively, a syllable that does not usually receive stress (such as a function word) may receive stress for contrastive purposes. In both Pierrehumbert and Brazil's models, the focus is on a prominent word, since the syllable chosen within the word is a matter of lexical stress.

The next level of analysis is the relational pitch height on a prominent word. In Brazil's framework, two prominent syllables, the first (key) and last (termination) are the focus. Pierrehumbert's framework similarly marks pitch height on prominent syllables in relation to other prominent syllables, but does not make the distinction of key and termination. Brazil marks three levels of relational pitch height (low, mid, and high) while Pierrehumbert marks two levels (low and high). In order to determine key and termination, identification of the beginning and ends of what Brazil calls tone units and Pierrehumbert calls intonation units is important. The term "tone" used in this way should be distinguished from the use of the word "tone" in languages that use variations of sound tone within words to distinguish lexical meaning (e.g. Chinese, Thai, Norwegian, etc.). Key and termination have been shown to connect to larger topical boundaries within a discourse. Specifically, an extremely high key is shown to mark the beginning of a new section of discourse while a low termination has been shown to end a section of discourse. This feature of tone has been referred to as a paratone.

In interactive dialogue between two persons, there can be a further classification of key and termination which is pitch concord. Pitch concord refers to a match of the key and termination heights between two speakers. This particular classification is discussed in Brazil's framework but not in Pierrehumbert's. However, other researchers have mentioned this phenomenon, if not using the same terminology. It refers to the fact that, in general, high pitch on the termination of one speaker's utterance anticipates a high pitch on the key of the next speaker's utterance, while mid termination anticipates a mid-key. There are no expectations for low termination. Pierrehumbert's system does not account for pitch concord, but it could be measured in the same way as in Brazil's model, by investigating the pitch height on one speaker's last prominent word in an utterance and the next speaker's first prominent word in an utterance when there is a turn change between speakers.

A final point of analysis is the tone choice. Tone choice (Brazil's term) refers to the pitch movement just after the final prominent syllable (the termination) in a tone unit. Pierrehumbert similarly focuses on this feature, and refers to it as a boundary tone. This applies to all five of the tones included in Brazil's system (falling, rising, rising-falling, falling-rising, and neutral). In addition, the pitch of the final prominent word (termination in Brazil's system) is combined with the pitch contour choice in many studies, creating the terms low rising, high falling and all other possible combinations. These combinations can, in various implementations, provide 15 tone possibilities for each tone unit: high-falling, high-rising, high-rising-falling, high-falling-rising, high-neutral, mid-falling, mid-rising, mid-rising-falling, mid-falling-rising, mid-neutral, low-falling, low-rising, low-rising-falling, low-falling-rising, and low-neutral.

Figure 1:
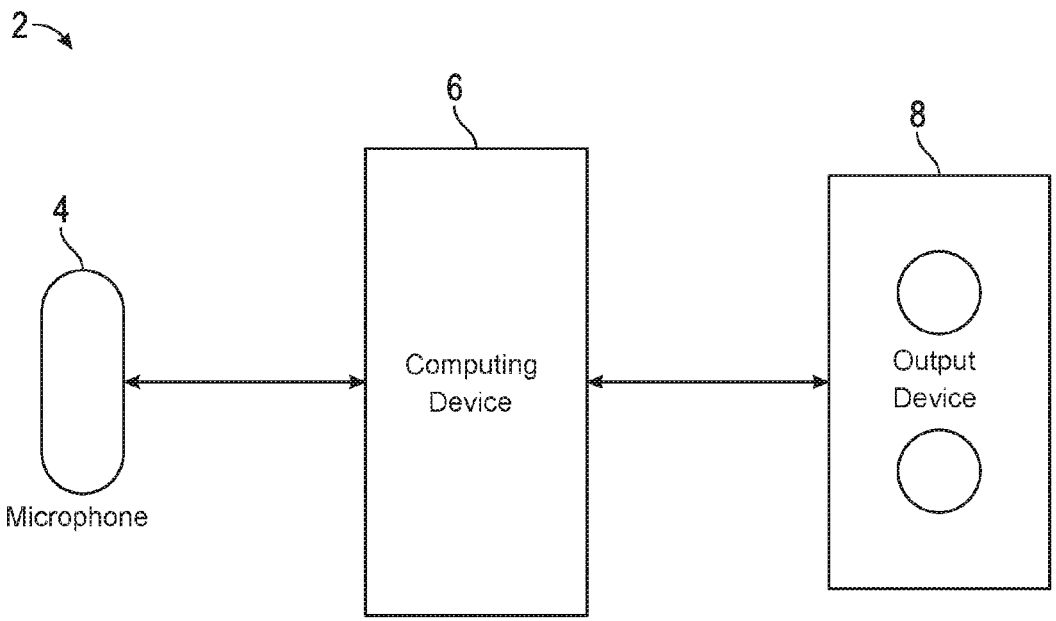
FIG. 1 is a block diagram of an implementation of a system for prosodic detection and modeling.

Referring to FIG. 1, a basic functional block diagram of an implementation of a system for prosodic detection and modeling 2 is illustrated. As illustrated, the system 2 includes one or more microphones 4 which are designed to translate/transduce spoken human speech into an electromagnetic signal forming an audio signal (audio data). The resulting audio signal is then received by computing device 6 which contains one or more microprocessors associated with memory and storage contained in one or more physical or virtualized computing devices. Computing device 6 may be a portable computing device (tablet, smartphone, etc.) or a fixed computing device (desktop, server, etc.) or any combination of portable and fixed computing devices operating together. Furthermore, microphone 4 may be directly coupled with computing device 6 or may be associated with another audio or computing device that is coupled with computing device 6 through a telecommunications channel such as the internet or a wireless telecommunications channel (such as BLUETOOTH®, WIFI, etc.). A wide variety of client/server and portable computing device/server/cloud computing arrangements may be utilized in various system implementations Computing device 6 in turn may be, depending on the implementation, coupled with a speaker 8 and/or other output device, such as a human readable display (display). The speaker 8 and/or display may be directly coupled to the computing device 6 or may be associated with another computing device coupled with the computing device 6 through a telecommunication channel such as the internet. The speaker 8 and/or display may provide audio, visual, and audiovisual feedback (including proficiency scoring information, as disclosed herein) to the human user of the system 2 that is created by the computing device 6 in response to receiving audio data from the microphone 4. Various system implementations may include additional microphones, speakers, or output devices depending upon the amount of audio data needed to be collected and the output information that needs to be shared.

Various system and method implementations may be used in language proficiency tests. Proficiency tests can be scored by humans or computers. When humans are used, human raters can encounter a number of limitations: (1) high expenses in hiring, training, and paying humans; (2) delayed processing by human graders; and (3) inconsistency or biases in human scores. Automated scoring systems can produce output more quickly and more reliably (consistently) without human-related bias issues. Automatic scoring of speech using computing systems has conventionally been more difficult to attain than that of reading, writing, and listening.

Two types of automated scoring systems for speech may be utilized: 1) those for constrained speech, such as constructed response items (i.e., questions needing short answer facts and other assignments eliciting easily anticipated speech), and 2) those for unconstrained, or unpredictable (unprompted), speech. Constrained speech models are easier to process and evaluate as it is possible to create a model of the ideal speech ahead of the test and focus the computing system on comparing the prosody, etc. of the received audio signal being evaluated to the model signals.

In contrast, unconstrained speech is irregular which makes automatic scoring and evaluation more difficult. To assess proficiency, an examiner typically obtains unconstrained speech by instructing the test-taker to talk about a common topic for a minute or longer, e.g., asking the test-taker to talk about a photograph for one minute. In a first system implementation, a machine learning classifier was experimentally developed that automatically assesses unconstrained English speech proficiency. This system implementation is disclosed in the paper by Okim Kang and David O. Johnson entitled "Automated English Proficiency Scoring of Unconstrained Speech", filed herewith as APPENDIX A to this document, the disclosure of which is hereby incorporated entirely herein by reference. In this implementation, the machine learning classifier computed the proficiency score from suprasegmental measures grounded on Brazil's prosody model. The computing device calculated the suprasegmental measures from the output of an ASR that detects phones instead of words by utilizing the elements of Brazil's prosody model. The system and method implementations disclosed in APPENDIX A may have two benefits over the one employed by conventional systems. The first is that the system recognizes phones instead of words. This means that the system only has to recognize the 60 phones that make up all English words (where English is the language being analyzed) instead of having to recognize the thousands of English words that might appear in unconstrained speech. Because there are fewer phones to recognize than words, the phone error rate (PER) of an ASR is usually lower than the word error rate (WER) which has the potential to lead to more accurate language proficiency scores and models. The second benefit results from the use of suprasegmental measures calculated from the components of Brazil's prosody model. Since suprasegmentals with a variety of prosody measures potentially explain over 50% of the variance in speaking proficiency ratings, the ability to use suprasegmentals directly when calculating proficiency ratings may reduce the error involved in such ratings.

For the system implementation disclosed in APPENDIX A, the Pearson's correlation between the computer's calculated proficiency scores and the official Cambridge English Language Assessment (CELA) scores was 0.677. CELA is an internationally recognized set of exams and qualifications for learners of English.

Various system and method implementations disclosed in this document use algorithms to calculate the suprasegmental parameters of prominent syllable detection and tone choice classification. In various implementations, this is done by using multiple speech corpora to train the machine learning classifiers employed to detect prominent syllables and to classify tone choice. Previous system implementations trained the machine learning classifiers with a subset of the DARPA TIMIT Acoustic-Phonetic Continuous Speech Corpus ("TIMIT") to detect prominent syllables and classify tone choices of speakers in a corpus of unconstrained speech. The classifiers employed were the ones that performed the best in a 5-fold cross-validation of the TIMIT subset. Additional details regarding this system and method implementation may be found in the paper by David O. Johnson and Okim Kang entitled "Automatic Prominent Syllable Detection With Machine Learning Classifiers," *Int. J. Speech Techno.*, V. 18, N. 4, pp. 583-592 (December 2015), referred to herein as "APPENDIX B," the disclosure of which is incorporated entirely herein by reference.

As was previously discussed, Brazil's model views intonation as discoursal in function. Intonation is related to the function of the utterance as an existentially appropriate contribution to an interactive discourse. Brazil's model includes a grammar of intonation patterns, an explicit algorithm for calculating pitch contours in speech, and an account of intonational meaning in the natural discourse.

The basic structure of Brazil's model is the tone unit. Brazil defines a tone unit as a segment of speech that a listener can distinguish as having an intonation pattern that is dissimilar from those of tone units having other patterns of intonation. As was previously discussed, all tone units have one or more prominent syllables, which are noticed from three properties: pitch (fundamental frequency of a syllable in Hz), duration (length of the syllable in seconds), and intensity (amplitude of the syllable in dB). Brazil is emphatic that prominence is on the syllable, and not the word. Brazil also differentiates prominence from lexical stress. Lexical stress is the syllable within a word that is accentuated as described in a dictionary. On the other hand, prominence is the application of increased pitch, duration, or intensity to a syllable to emphasize a word's meaning, importance, or contrast. Every tone unit in the Brazil model contains one or more prominent syllables. The first one is called the key prominent syllable and the last one is called the termination, or tonic, prominent syllable. If a tone unit includes only one prominent syllable, it is considered both the key and termination prominent syllable. A tone unit's intonation pattern is characterized by the relative pitch of the key and tonic syllables and the tone choice of the tonic syllable. As previously discussed, Brazil quantified three equal scales of relative pitch: low, mid, and high, and five tone choices: falling, rising, rising-falling, falling-rising, and neutral.

Brazil was among the earliest to conceptualize the idea of discourse intonation. He described intonation as the linguistically significant application of vocal pitch movement and pitch intensity during a discourse. His framework did not necessitate new phonological or acoustic classes in terms of the pitch attribute in contrast to earlier theories. However, his model assigned meanings and functions to traditional intonation components which differed from earlier intonation models. He held that intonation was a constant process of selecting one intonation pattern over another to accomplish the interactive purposes of a discourse. He asserted that the four main elements of his model, i.e., tone unit, prominence, tone choice, and relative pitch, offered a convenient means for studying and understanding the intonation selections that speakers rendered in spontaneous dialogs. Brazil's framework is often applied to language teaching and learning by focusing on the use of linguistic features beyond the sentence level. Since Brazil's model encompasses both constrained and unconstrained speech in monologs and dialogs, it may be a useful model to employ in particular method and system implementations. However, other linguistic and/or prosodic models may be employed in other implementations, such as the Pierrehumbert model.

The system implementation disclosed in APPENDIX A discloses a machine learning classifier that automatically assesses unconstrained English speech proficiency from a raw audio file. The method implementation employed by the system may include the following steps: 1) recognizing the phones and pauses that make up a utterance, 2) dividing the utterance into runs (groups of tone units), 3) grouping the phones into syllables, 4) identifying the filled pauses, 5) detecting the prominent syllables, 6) identifying tone units and classifying the tone choice (falling, rising, rising-falling, falling-rising, or neutral) of the tonic syllables (last prominent syllable in a tone unit), 7) computing the relative pitch (low, mid, or high) of the tonic syllables, 8) calculating 35 suprasegmental measures derived from counts of pauses, filled pauses, tone units, syllables, prominent syllables, tone choices, and relative pitch, and 9) assigning an language proficiency rating by analyzing the suprasegmental measures. This method implementation focuses on calculating a language proficiency rating, but it could be used to build a prosody model of the particular unconstrained speech processed or general speech from a particular user or users (as in conversational speech) that could be used in any of the various applications disclosed in this document. Each of these various process steps is discussed in greater detail as follows.

Figure 4:
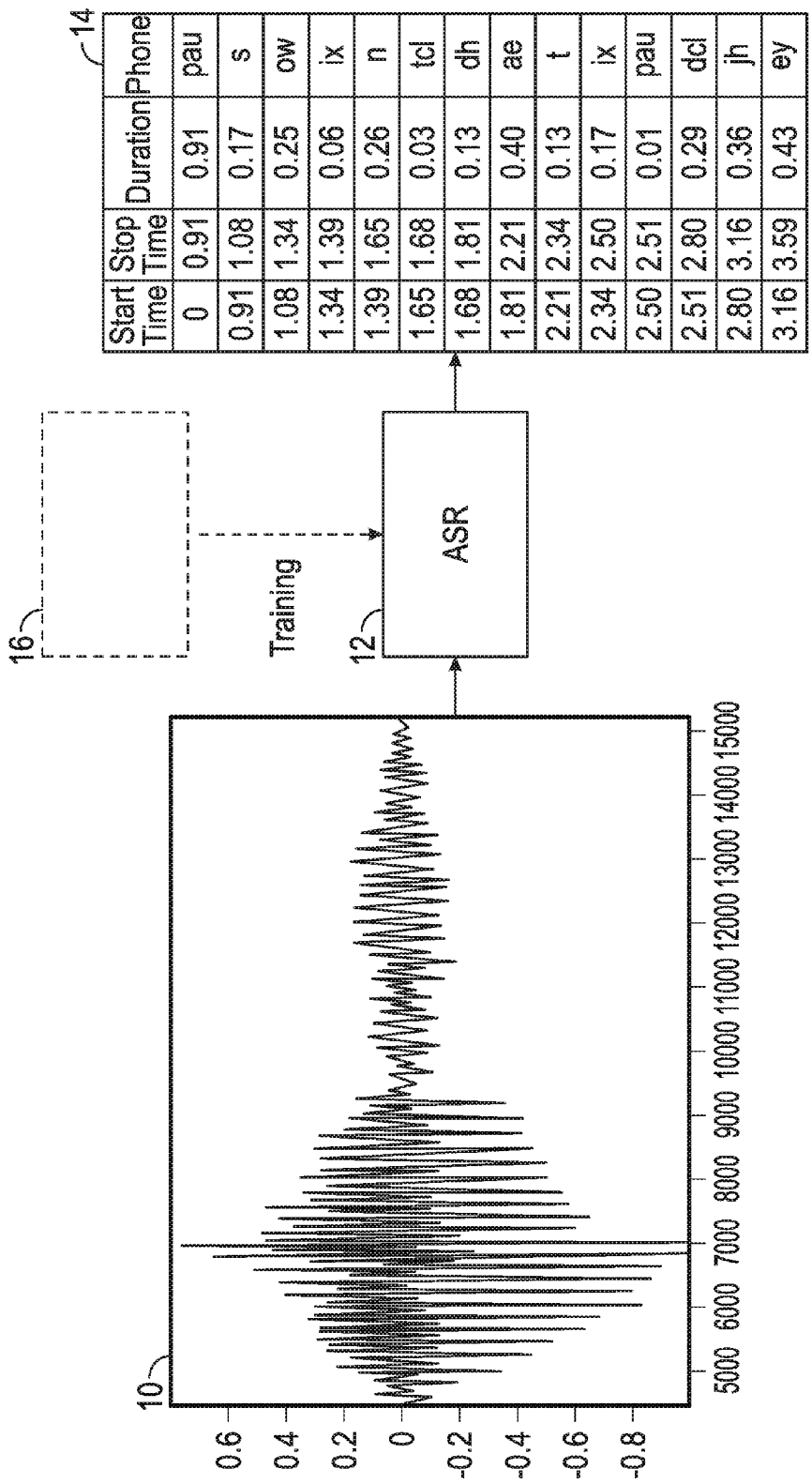
FIG. 4 is a graphical representation of a process of creating a time-ordered transcription of a plurality of phones.

The system implementation 2 may be used by various method implementations to assess a proficiency level in a particular language, such as English. For the exemplary purposes of this disclosure, a particular method implementation includes receiving an audio signal from the microphone 4 which corresponds with an audible unconstrained speech utterance from a user whose proficiency in a particular language is being tested. The microprocessor and memory of the computing unit 6 then receive the audio signal and process the audio signal. The processing begins with translating the data from the audio signal into the 60 phones identified in the TIMIT. In various implementations, translating the data includes constructing time-aligned phone transcriptions of the audio speech files using an ASR program (which in some implementations may be a component of a large vocabulary spontaneous speech recognition (LVCSR) program). These transcriptions include a plurality of phones and a plurality of pauses included in the audio signal. Referring to FIG. 4, a graphical representation of the process of taking the audio signal 10 and processing it using the ASR 12 to produce a time ordered transcription 14 of the plurality of phones and the plurality of pauses in the audio signal 10 is illustrated. As illustrated, a training speech corpus 16 was used to train the ASR 12, which could be any disclosed in this document, or any speech corpus created for any particular language to be modeled and tested.

In various implementations, the ASR 12 is utilizes KALDI speech recognition engine disclosed in the '220 Provisional previously incorporated by reference, though other engines could be used, including, by non-limiting example, the Praat engine authored by Paul Boersma and David Weenik of the University of Amsterdam, or the Multi-Speech and CSL Software by KayPENTAX of Montvale, N.J. In various implementations, the 4,620 utterances in the TIMIT training set may be utilized to train the ASR. In experimental results using the KALDI speech recognition engine, the trained ASR was able to recognize the phones of the 1,680 utterances in the TIMIT test set with a phone error rate (PER) of 16%. Additional disclosure regarding the accuracy and methods related to speech recognition engine generated prosodic transcriptions may be found in the paper by Johnson et al. entitled "Comparison of Inter-rater Reliability of Human and Computer Prosodic Annotation Using Brazil's Prosody Model," English Linguistics Research, V. 4, No. 4, p. 58-68 (2015), referred to herein as "APPENDIX H", the disclosure of which is hereby incorporated entirely herein by reference.

A silent pause in the transcription 14 illustrated in FIG. 4 is symbolized with the TIMIT phone pau. In various method implementations, identifying a plurality of silent pauses in the audio signal includes identifying a plurality of silent pauses among the plurality of pauses. To enhance silent pause detection, in various method implementations, the LVCSR output may be processed in the following manner: 1) changing TIMIT phones f, k, t, n, and epi happening prior to a short pau phone (i.e., a pau less than 100 msec long) to apau, 2) exchanging single consonant phones between two long pau phones (i.e., a pau longer than 100 msec) with a single pau, 3) merging adjacent pau phones into one longer pau, and/or 4) substituting high intensity pau phones or ones which have a pitch contour with a pseudo phone, ?, signifying a non-pause phone of unknown type. Other processes and methods of filtering and/or parsing the audio signal may be used to detect silent pauses in various implementations. Additional disclosure regarding methods for identifying silent pauses and tone units may be found in the paper by Johnson et al. entitled, "Automatic Detection of Brazil's Prosodic Tone Unit," filed herewith as APPENDIX 1 to this document, the disclosure of which is hereby incorporated herein entirely by reference.

Figure 5:
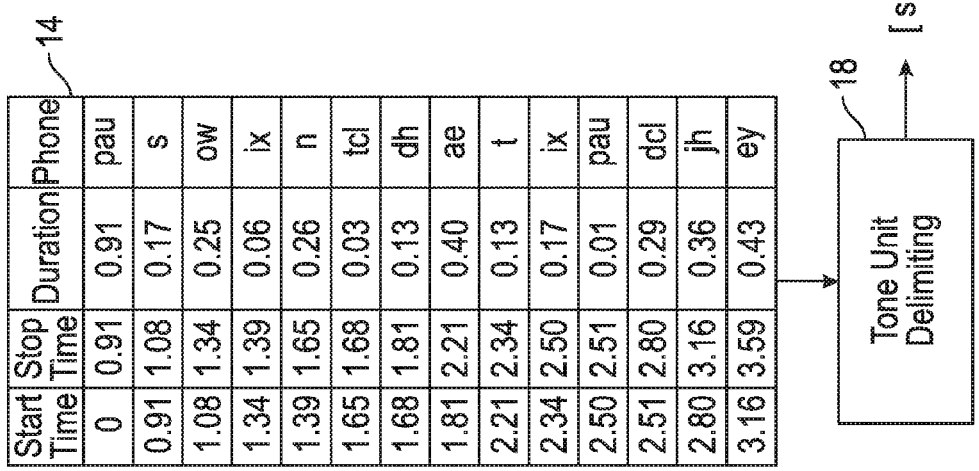
FIG. 5 is a graphical representation of a process of using a tone unit delimiting process to identify a plurality of tone units from the time-ordered transcription of FIG. 4.

The method implementation also includes dividing the plurality of phones and plurality of pauses into a plurality of tone units. This is done, by non-limiting example, by scrutinizing the sequencing of the silent pauses (pan) in the time ordered transcription of the audio signal using a plurality of identified pitch resets and a plurality of identified slow pace values. This process is illustrated in FIG. 5, which shows the time ordered transcription 14 being processed using in a tone unit delimiting functional block 18 carried out using the microprocessor and the memory of the computing device 6. Tone units are delineated by silent pauses which are lengthier than 200 ms or last from 150 ms to 200 ms, followed by either a pitch reset or a slow pace. Pitch reset is when the relative pitch of the three phones previous to the pau is high and the relative pitch of the three phones following it is low, or just the opposite (i.e., high after and low before). Slow pace is identified when the three phones after the pau are longer than the average length of the three phones. The average length of each phone in various implementations is calculated using the lengths of all phones included in the entire utterance being evaluated. An example of a set of tone units 20 delineated in braces between silent pauses (pan) corresponding with the time ordered transcription 14 is illustrated in FIG. 5.

Figure 6:
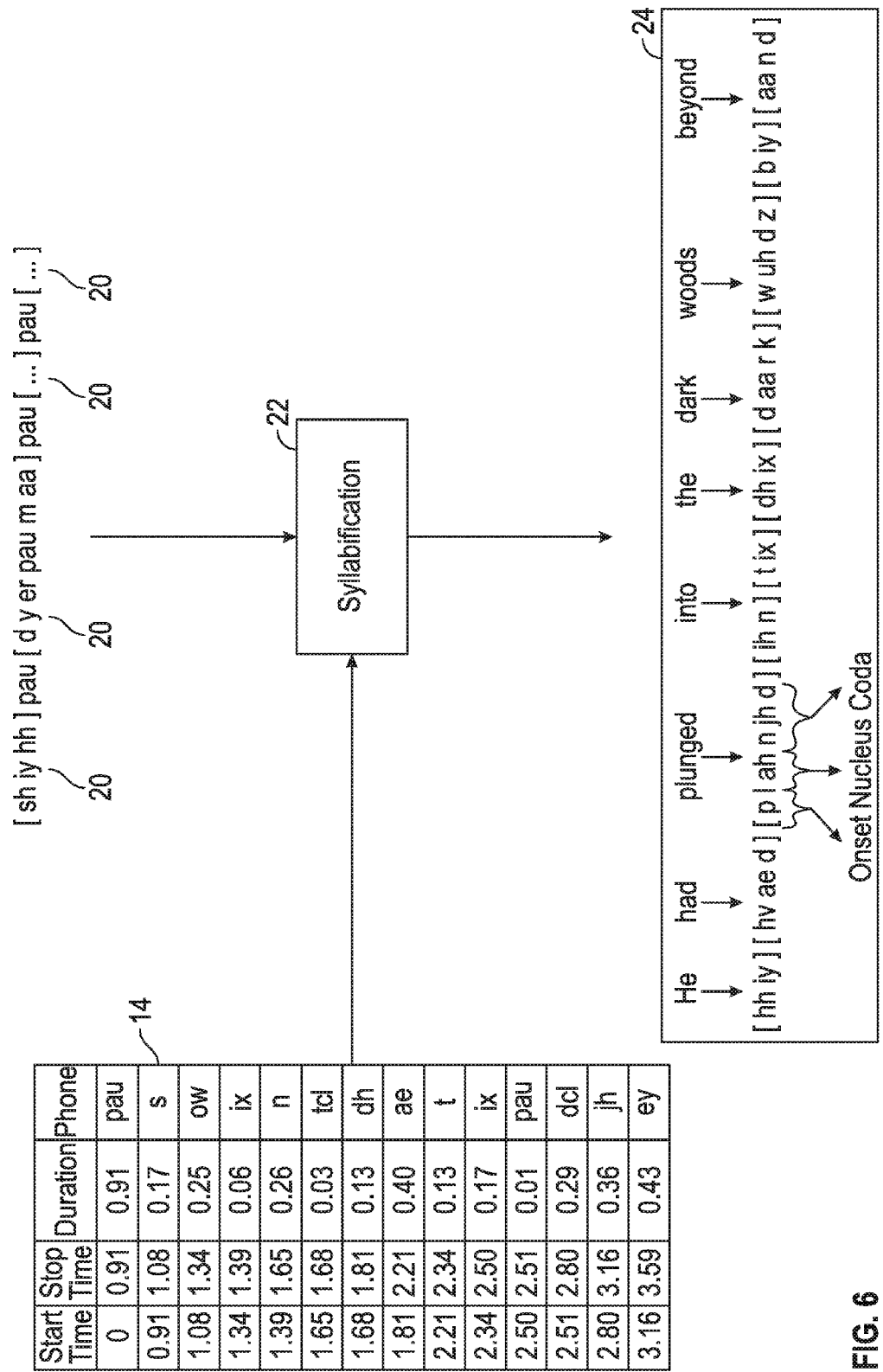
FIG. 6 is a graphical representation of a process of using a syllabification functional block to group a plurality of phones in the time-ordered transcription of FIG. 4 into a plurality of syllables.

Implementations of the method include grouping the plurality of phones into a plurality of syllables. In various implementations, by non-limiting example, this is done by combining the phones into syllables by grouping consonant phones with the vowel or syllabic consonant phone closest to them in time. This process is illustrated in FIG. 6 where the time ordered transcription 14 and the sequence of tone units 20 from FIG. 5 are illustrated being processed by a syllabification functional block 22 carried out using the microprocessor and memory of the computing unit 6. The resulting sequence of syllables 24 is illustrated in FIG. 6 which shows how each syllable includes an onset of one or more phones, a nucleus of one or more phones (depending on the size of the syllable), and a coda of one or more phones. The vowel and syllabic consonant phones are: aa, ae, ah, ao, aw, ar, ax-h, axr, ay, eh, el, em, en, er, ey, ih, iy, ix, ow, oy, uh, uw, and ux. The closest vowel or syllabic consonant is determined, by non-limiting example, by computing the length of time from the consonant phone to the vowel or syllabic consonant in front of and in back of it.

Figure 7:
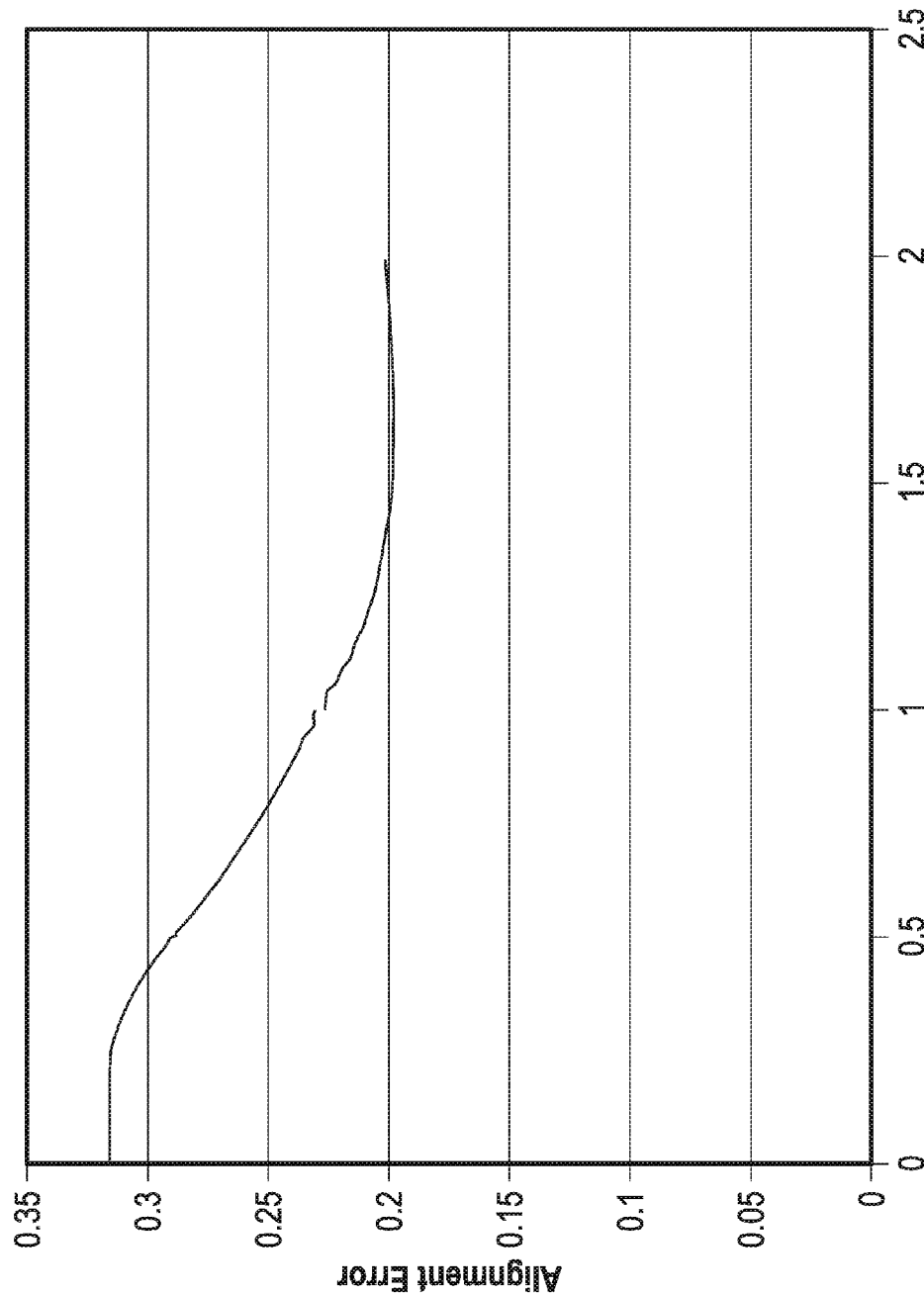
FIG. 7 is a graph of syllable alignment error versus values of the bias value b.

The in-front-of-duration, in particular implementations, is multiplied by a bias value, b, where b>0. The bias value implements the maximal onset principle of syllabification which tends to group a consonant more frequently with the subsequent vowel or syllabic consonant. The consonant is grouped with the previous vowel or syllabic consonant, if the biased in-front-of-duration is less than the in-back-of-duration. Referring to the graph of the alignment error (syllable alignment error) versus values of the bias value b illustrated in FIG. 7, the bias b was computed as 1.643 experimentally by an exhaustive search of potential numbers from 0.001 to 2.000 in increments of 0.001. The exhaustive search was performed by minimizing the syllable alignment error rising from syllabifying the 1,680 TIMIT test sentences. Syllable alignment error (e) is the percentage of the utterance length where the computer produced syllables do not correspond with the ground-truth syllables specified in the TIMIT corpus. Experimental data showed that with b set to the best value of 1.643, e for the 1,680 TIMIT test utterances was 19.761%.

Figure 8:
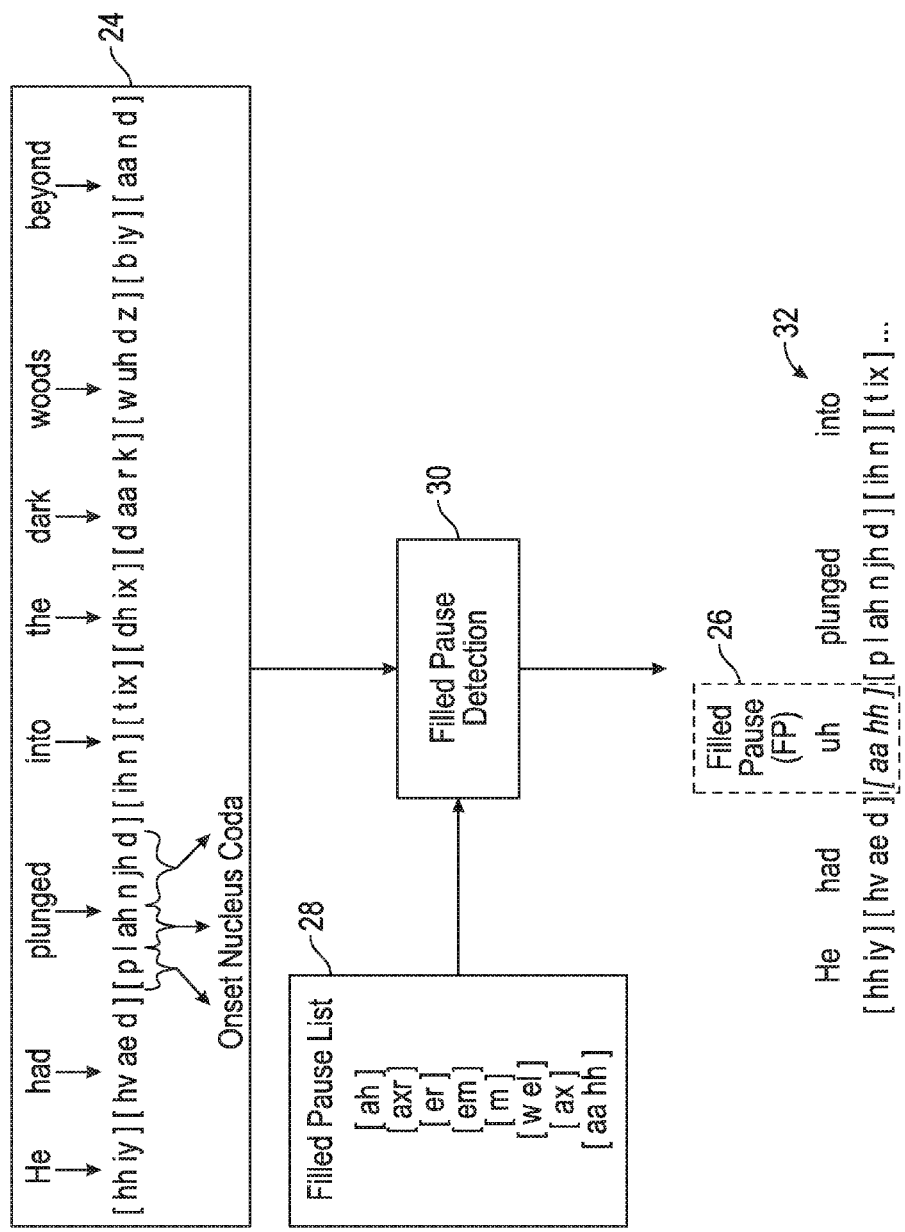
FIG. 8 is a graphical representation of a process of using a filled pause detection functional block to identify a plurality of filled pauses from among a plurality of pauses among a plurality of syllables.

The method further includes identifying a plurality of filled pauses from among the plurality of pauses in the time ordered transcription. A filled pause is any word or noise articulated to fill gaps in speech (e.g., erm, huh, like, uh, um, well, you know), but it does not include repetitions, restarts, or repairs. Filled pauses are generally neither meaningful nor purposeful. They are referred to as filled pauses because they have the same prosodic function as silent pauses but are audible rather than silent. In various implementations, a tone unit containing only syllables from the set of {ah, arr, er, em, m, w_el, ax, aa_hh} is considered a filled pause. As illustrated in this document and in FIG. 8, a syllable is denoted as phones combined with the underscore character, e.g., aa_hh is the syllable for "uh" or between square brackets). FIG. 8 illustrates how a filled pause 26 syllable has been identified using a filled pause detection functional block 30 implemented by the microprocessor and the memory of the computing device 6 using the filled pause list 28 and the sequence of syllables 24 from FIG. 6.

Figure 9:
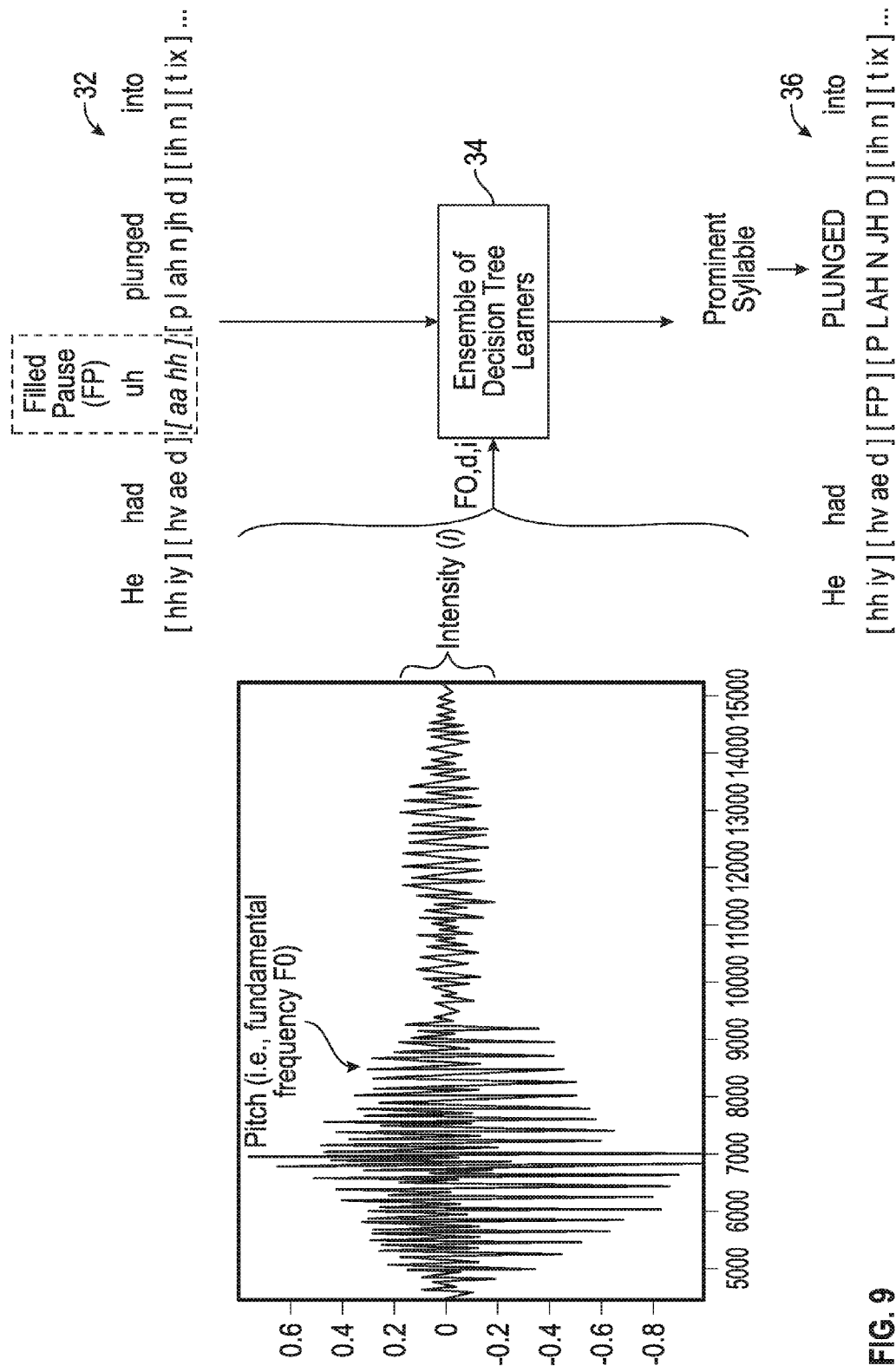
FIG. 9 is a graphical representation of a process of using an ensemble of decision tree learners to identify a plurality of prominent syllables from among a plurality of syllables.

The method further includes detecting a plurality of prominent syllables from among the plurality of syllables. Referring to FIG. 9, the sequence of syllables 32 from FIG. 8 is illustrated being processed by a functional block that represents, by non-limiting example, a bagging ensemble of decision tree learners 34 (which will be described in more detail herein and in APPENDIX A). As illustrated, an input received by the functional block 34 is data relating to the pitch (fundamental frequency F0), the duration (d), and/or the intensity (i). The bagging ensemble of decision tree learners evaluate the pitch, duration, and intensity features of each syllable to detect prominent syllables, producing a sequence of syllables 36 with prominent syllables identified, as illustrated in FIG. 9. As described in APPENDIX A, a 5-fold cross-validation experiment was carried out involving a bagging ensemble implemented with the MATLAB® fitensemble function using 100 decision tree learners (The Mathworks, Inc. of Natick, Mass.) which demonstrated performance with an accuracy of 95.9%±0.2%, an F-measure of 93.7±0.4, and a κ of 0.907±0.005. In this experiment, the ensemble was trained on the prominent syllables in 839 utterances from the TIMIT corpus identified by a trained analyst as described further herein. In particular implementations, two or more speech corpora may be used for training. Additional disclosure regarding system and method implementations may be found in the paper by Johnson et al., entitled, "Automatic prominent syllable detection with machine learning classifiers," previously incorporated by reference herein as APPENDIX B of the '220 Provisional.

Figure 10:
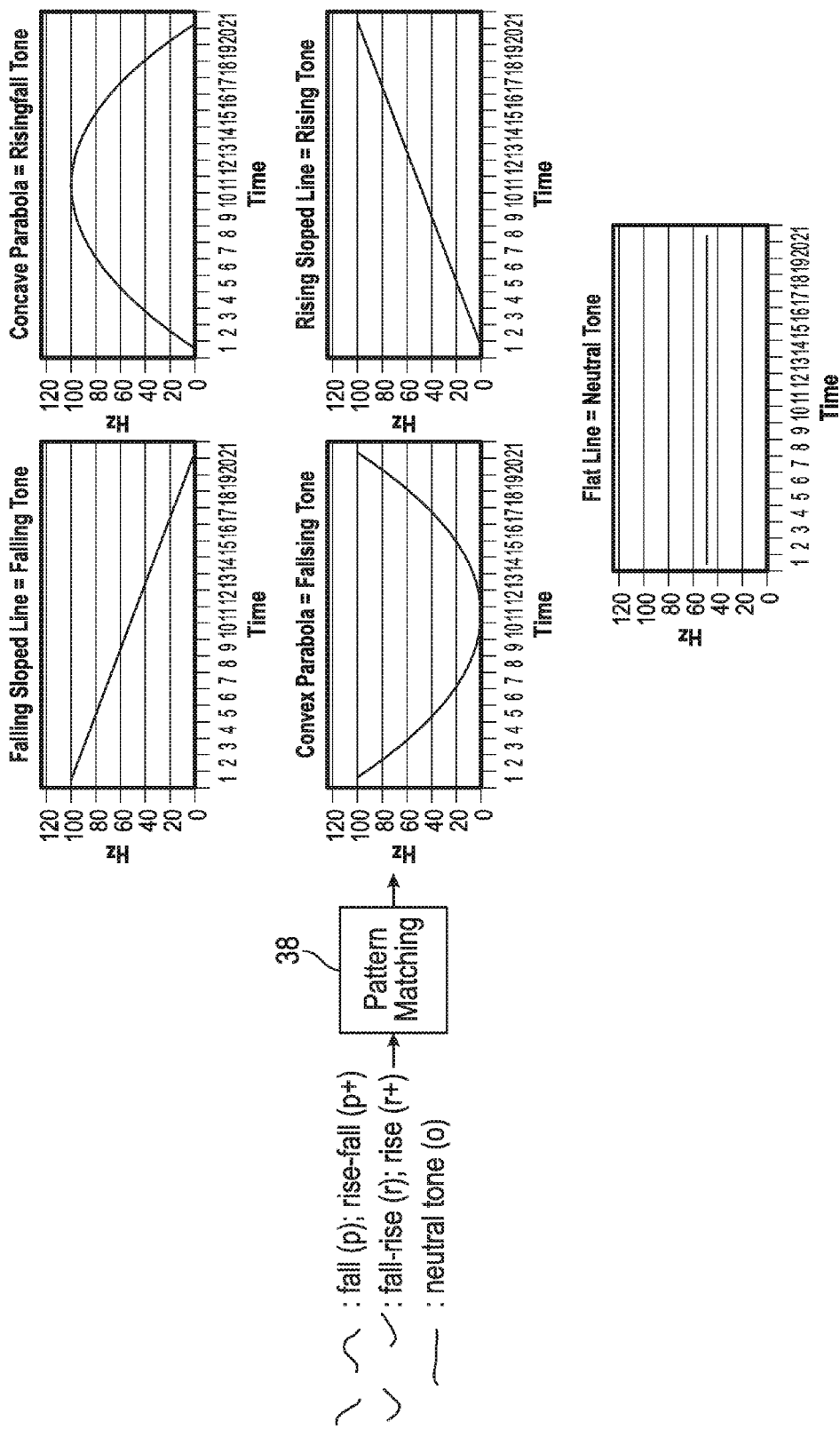
FIG. 10 is a graphical representation of a process of using a pattern matching functional block to evaluate the time-dependent behavior of the tone of a tonic syllable.
Figure 11:
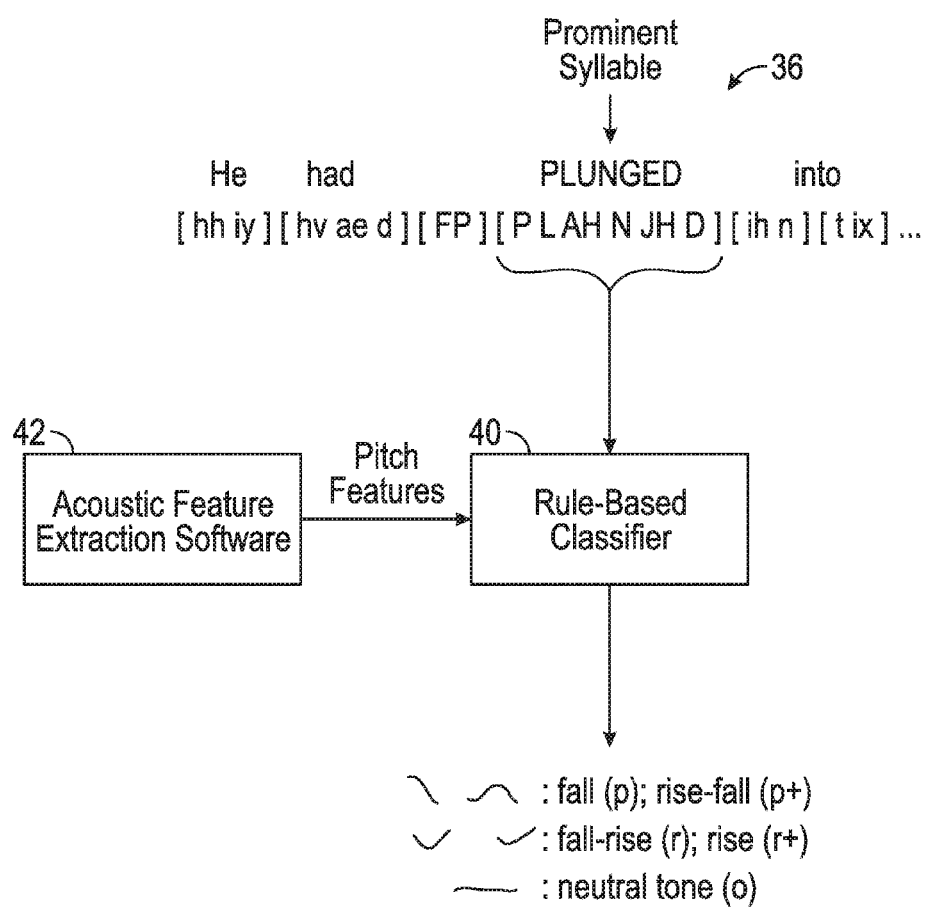
FIG. 11 is a graphical representation of a process of using a pattern matching functional block including a rule-based classifier to determine tone choice of tonic syllables.

The method includes identifying, from among the plurality of prominent syllables, a plurality of tonic syllables. The method also includes identifying a tone choice for each of the tonic syllables to form a plurality of tone choices. This can be done in a variety of ways in various implementations. Referring to FIG. 10, the 5 Brazil tones are illustrated which are used by a pattern matching functional block 38 operated by the microprocessor to evaluate the time-dependent behavior of the tone of a tonic syllable and identify which of the 5 tones corresponds with the tonic syllable. The graphs on the right of FIG. 10 show the time-dependent behavior of the pitch of the tonic syllable for each of the 5 Brazil tones. In particular implementations, referring to FIG. 11, the pattern matching functional block 38 includes a rule-based classifier 40, which operates in conjunction with an acoustic feature extraction functional block 42 to analyze pitch data for each prominent syllable in the syllable sequence 36 to determine whether it is a tonic syllable, and then, if a prominent syllable is determined to be a tonic syllable, then determine the tone choice of the syllable. In particular implementations, the rule-based classifier determines the tone choice by analyzing the pitch contour of the last prominent syllable of the tone unit (tonic syllable) with a 4-point model. Experimental data discussed further herein indicated that the rule-based classifier attained an accuracy of 75.1% and a Cohen's kappa coefficient of 0.73 within 5-fold cross-validation experiments on the tone choices of 839 utterances from the TIMIT corpus (see APPENDIX D).

Figure 12:
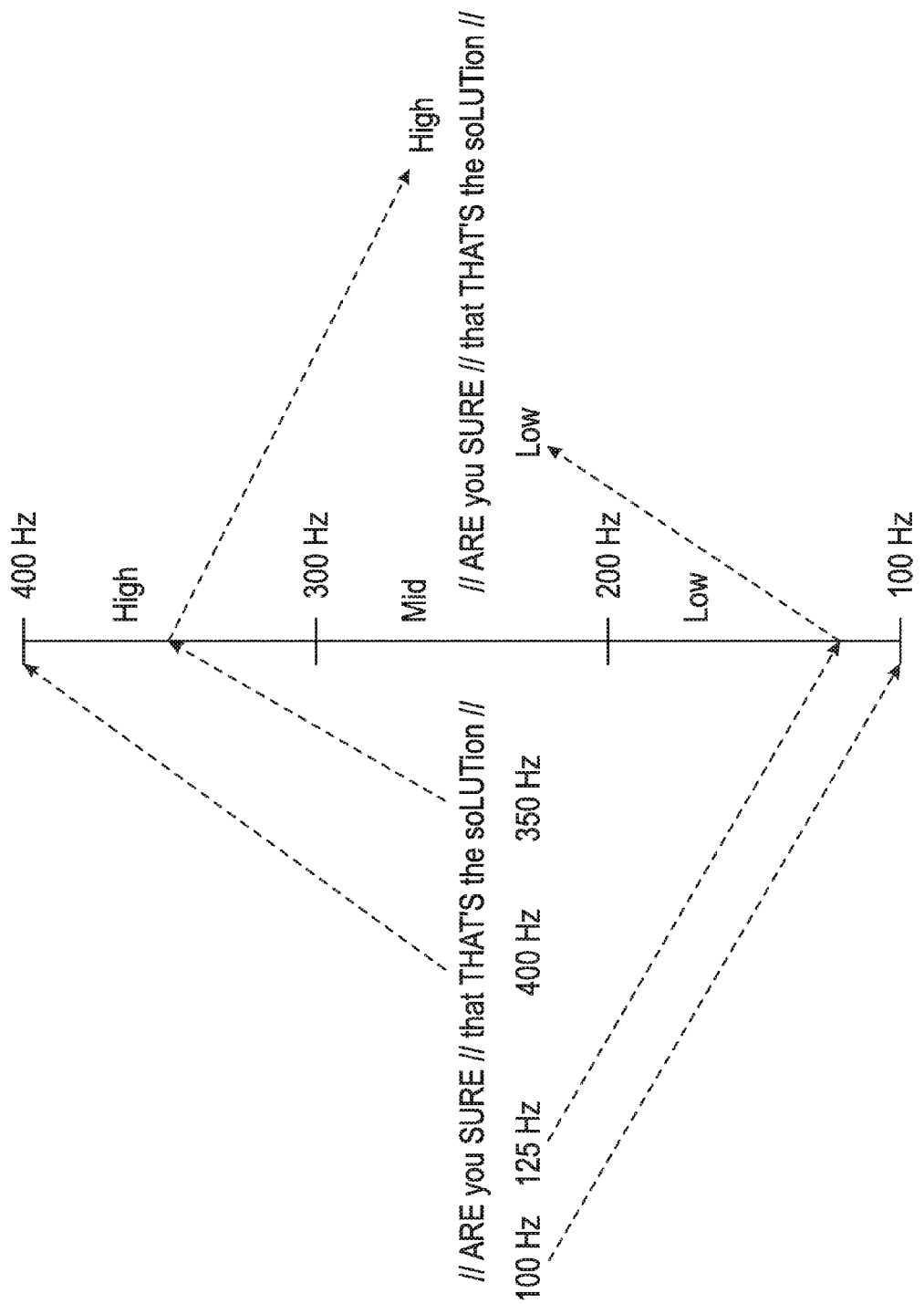
FIG. 12 is a diagram showing assignment of various pitch ranges by frequency of syllables for specific syllables.

The method further includes calculating a relative pitch for each of the tonic syllables of the plurality of tonic syllables using the microprocessor and memory. In various implementations, this is done by calculating the relative pitch is calculated with an objective algorithm. The pitch height of the whole utterance is split into three uniform ranges: low, mid, and high. Referring to FIG. 12, a diagram showing the assignment of the various pitch levels by frequency of the syllables for specific syllables is illustrated. The relative pitch of the key or tonic syllable is the range within which most of the pitch contour points occur.

In various implementations, the method includes calculating a plurality of suprasegmental parameters using the plurality of pauses, the plurality of tone units, the plurality of syllables, the plurality of prominent syllables, the plurality of tone choices, and the plurality of relative pitch values. Various different types of suprasegmental values and different numbers of suprasegmental values may be calculated and used in various method implementations. By non-limiting example, in a particular implementation disclosed in this document, 35 suprasegmental measures are calculated using the counts, pitch ranges, and durations of tone units, pauses, syllables, filled pauses, prominent syllables, tone choices, and relative pitches. These 35 suprasegmental measures are divided into five categories: rate, pause, stress, pitch, and paratone. Additional disclosure regarding suprasegmental measures may be found in the paper by Okim Kang, entitled "Relative Salience of Suprasegmental Features on Judgments of L2 Comprehensibility and Accentedness," System, V. 38, No. 2, p. 301-315 (June 2010), referred to herein as "APPENDIX C," and in the paper by Kang et al., entitled "Suprasegmental Measures of Accentedness and Judgments of Language Learner Proficiency in Oral English," *The Modern Lang. J.*, V. 94, No. 4, p. 554-566 (2010) the disclosures of each of which are hereby incorporated entirely herein by reference. Additional disclosure regarding particular suprasegmental measures and prosodic features and their contribution to language proficiency assessment may be found in the paper by Johnson et al., entitled "Comparison of Suprasegmental Feature Contribution to Human and Automated Unconstrained Speech Proficiency Assessment," filed herewith as APPENDIX J to this document, the disclosure of which is hereby incorporated entirely herein by reference.

Figure 13:
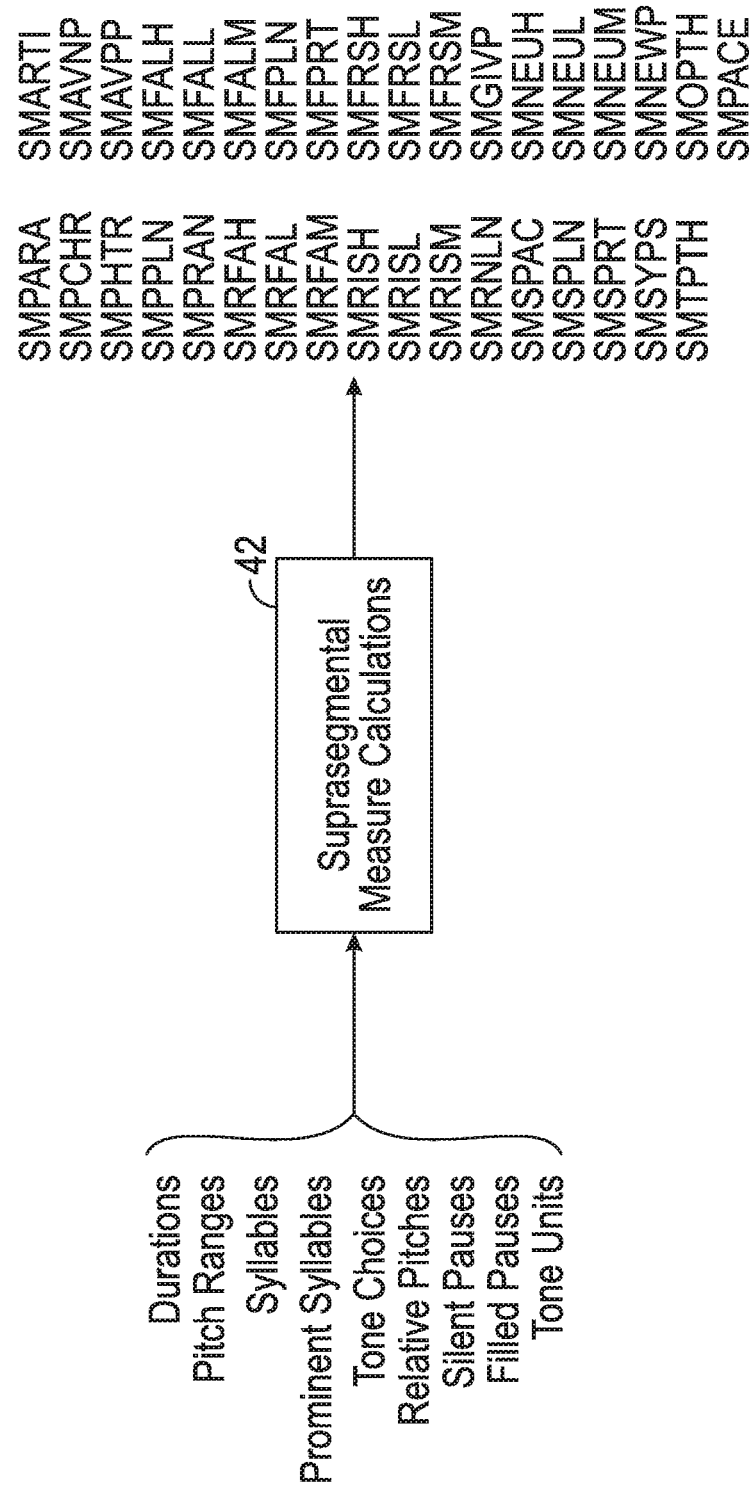
FIG. 13 is a graphical representation of input prosodic parameters and a functional block that calculates a list of suprasegmental parameters.

Referring to FIG. 13, a diagram of the input prosodic parameters and a functional block 42 implemented using the microprocessor and memory that calculate the resulting list of suprasegmental parameters is illustrated. The SM in front of the various measures represents the Suprasegmental Measure characteristic being analyzed. The various measures are, by non-limiting example: articulation rate (ARTI), phonation time ratio (PHTR), tone unit mean length (RNLN), and syllables per second (SYPS); the pause measures include: filled pause mean length (FPLN), filled pauses per second (FPRT), silent pause mean length (SPLN), and silent pauses per second (SPRT); the stress measures include: pace, i.e., prominent syllables per tone unit (PACE), percent of tone units containing at least one prominent syllable (PCHR), and space, i.e., percent of syllables that are prominent (SPAC); the pitch measures include: overall pitch range (PRAN), non-prominent syllable mean pitch (AVNP), prominent syllable mean pitch (AVPP), falling-high rate (FALH), falling-low rate (FALL), falling-mid rate (FALM), fall-rise-high rate (FRSH), fall-rise-low rate (FRSL), fall-rise-mid rate (FRSM), neutral-high rate (NEUH), neutral-low rate (NEUL), neutral-mid rate (NEUM), rise-fall-high rate (RFAH), rise-fall-low rate (RFAL), rise-fall-mid rate (RFAM), rising-high rate (RISH), rising-low rate (RISL), rising-mid rate (RISM), given lexical item mean pitch (GIVP), and new lexical item mean pitch (NEWP); the paratone measures include: paratone boundary onset pitch mean height (OPTH), paratone boundaries per second (PARA), paratone boundary mean pause length (PPLN), and paratone boundary mean termination pitch height (TPTH).

For method implementations in which language proficiency is being determined, the method includes calculating a language proficiency rating for the user being tested using one or more of the plurality of suprasegmental parameters. In various implementations, by non-limiting example, a pairwise coupled ensemble of decision tree learners are used with the microprocessor to calculate the language proficiency rating using the suprasegmental parameters. In particular implementations, as described in APPENDIX A, a pairwise GentleBoost ensemble of 100 decision tree learners implemented with the MATLABfitensemble function took the PCHR, NEUL, NEUH, FRSM, PRAN, SYPS, ARTI, FPLN, OPTH, GIVP, and FALH suprasegmental measures as input and produced an English proficiency score based on the CELA/CEFR grading system of CPE/C2, CAE/C1, FCE/B2, and PET/B1. In a test disclosed in APPENDIX A with 120 non-native English speakers in the CELA corpus, the Pearson's correlation between the human examiners' official CELA scores and those from the computer was 0.677.

In the various experiments disclosed in APPENDIX A, a subset of 839 utterances from the TIMIT speech corpus 1,680 test set was used to train the machine learning classifiers that recognized prominent syllables and tone choices. In experiments disclosed in this document this subset was used in combination with the Boston University Radio News Corpus (BURNC) to improve the prominent syllable and tone choice machine learning classifiers. With respect to calculating language proficiency score, three speech corpora were used to train the system components: TIMIT, BURNC, and the Cambridge English Language Assessment (CELA) corpus.

Example 1

The TIMIT contains a total of 6300 sentences spoken by 630 speakers from eight major dialect regions of the United States. Each speaker read ten sentences consisting of two dialect sentences, five phonetically-compact sentences, and three phonetically-diverse sentences. The dialect sentences were intended to reveal the speaker's dialect. All speakers read the same two dialect sentences. Seven different speakers read each of the 450 phonetically-compact sentences which incorporated a full set of typical English language phone pairs plus additional phonetic combinations deemed by the TIMIT designers to be either of special interest or difficult to say. Only one speaker read each of 1890 phonetically-diverse sentences which were designed to utilize all allophonic combinations. The corpus also includes beginning and ending times for the phones, phonemes, pauses, syllables, and words. Additionally, the TIMIT corpus defines alphabetic abbreviations for the 60 phones which many other speech corpora utilize. The 6,300 speech files are partitioned into 1,680 speech files recommended for testing and 4,620 speech files recommended for training. The speakers in the training files are not the same as the ones in the test files. Both sets of files contain a minimum of one female and one male speaker of each dialect. There is minimum sentence duplication in the two sets. The test set includes all the phonemes which occur more than once in unrelated circumstances. In the experiments disclosed here the ASR that recognizes the phones was trained using the full recommended set of 4,620 speech files. TIMIT is utilized to train the ASR because of its phonetically compact and diverse set of sentences.

Table 1 gives the gender and dialect of the 839 utterances.

TABLE 1

| Dialect | Female | Male | Total |
| --- | --- | --- | --- |
| New England | 4 | 7 | 11 |
| Northern | 8 | 18 | 26 |
| North Midland | 3 | 23 | 26 |
| South Midland | 16 | 5 | 21 |
| Total | 31 | 53 | 84 |

The tone units, prominent syllables, tone choices, and relative pitch of the 839 utterances were annotated by two trained analysts who listened to the audio files and used Praat (Boersma and Weenink) and Multi-Speech and Computerized Speech Laboratory (CSL) Software (KayPENTAX), to inspect the pitch contours, intensity, and duration of the syllables. The two analysts studied any inconsistencies and recommended annotating more samples until there were no more inconsistencies. This process covered about 10% of all of the speech files. The first analyst then marked the remainder of the corpus by herself. This method of annotation has been widely utilized as a reliable classification practice in other applied linguistics investigations.

BURNC is a corpus of more than seven hours of radio news stories read by three female and four male professional newscasters. The stories are divided into paragraphs composed of several sentences. The corpus also includes orthographic transcriptions, phonetic alignments, part-of-speech tags, and prosodic labels for some of the paragraphs. Constrained speech recognition in conjunction with manual correction was utilized to produce phonetic alignments of the stories judged to be not noisy.

A subset of 144 utterances from BURNC were selected for use in various combinations with the 839 TIMIT utterances described above to improve the prominent syllable and tone choice machine learning classifiers in these experiments. BURNC was included because unlike TIMIT, it includes long durations of normal everyday speech spoken by trained professionals. TIMIT, on the other hand, contains short somewhat contrived sentences to make the corpus phonetically rich which are spoken by non-professional speakers. The 144 utterances are made up of 24 paragraphs from each of six speakers in the corpus. Table 2 shows the stories picked for the 144 utterances.

TABLE 2

| Speaker | Stories |
| --- | --- |
| f1a | s01, s02, s03, s04, s05 |
| f2b | s03, s05, s06, s09, s10 |
| f3a | s01, s02, s03, s04, s05, s07, s08, s09, s10, rrl, trl |
| m1b | s01, s09, s10, s03, s02 |
| m2b | s01, s02, s04, s03 |
| m3b | jrl, prl, rrl, trl |

The stories were decided on by the recording quality and the amount of paragraphs. The same methodology applied to the TIMIT corpus was utilized to annotate the tone units, prominent syllables, tone choices, and relative pitch of the 144 BURNC utterances. The syllable start and end times were calculated automatically using the phonetic transcriptions in the dictionary and the phonetic time alignments provided with the corpus. The phonetic transcriptions in the dictionary were manually corrected to match the phonetic time alignments for the instances where they did not match.

The CELA corpus consists of 120 speech files of non-native English speaker's monologs from the speaking part of the CELA (Cambridge English Language Assessment, 2015). It includes 21 first languages: 16 Mexican/Spanish, 11 Korean, eight Italian, seven Dutch, six French, five Chinese, five Russian, four Greek, four Portuguese, four Swedish, three German, two Swiss, two Japanese, and one each of Brazilian, Bulgarian, Bolivian, Austrian, Turkish, Arabic, Colombian, and Estonian. Each of the speakers has attained one of the four CELA levels of English proficiency (from highest to lowest: Certificate of Proficiency in English (CPE), Certificate in Advanced English (CAE), First Certificate in English (FCE), and Preliminary English Test (PET). CELA's levels of proficiency correspond to the Common European Framework of Reference for Languages (CEFR): C2, C1, B2, and B1, respectively. Each speaker was evaluated by two examiners and received a passing grade greater than or equal to 75 on a scale of 100. The number of males and females and subject and duration of the monologs are given in Table 3.

TABLE 3

| Proficiency | Males | Females | Monolog Subject (duration in minutes) |
| --- | --- | --- | --- |
| CPE | 5 | 17 | Question from a card with several ideas on it (2 min) |
| CAE | 11 | 23 | Scenes in two pictures (1 min) |
| FCE | 11 | 21 | Two photographs (1 min) |
| PET | 16 | 16 | One photograph (1 min) |

The experiments in this example were divided into two stages. The first experiments identified a set of prominent syllable detectors (i.e., machine learning classifiers and features for detecting prominent syllables) and a set of tone choice classifiers (i.e., machine learning classifiers and features for classifying tone choices). The next experiments determined which combination of prominent syllable detector and tone choice classifier improved the Pearson's correlation, between the computer's calculated proficiency scores and the official proficiency scores obtained from the CELA.

To identify a set of prominent syllable detectors, the performance of five classifier types was measured: neural network, decision tree, support vector machine, bagging, and boosting with seven sets of features consisting of combinations of three features: pitch, intensity, and duration, taken one at time, two at a time, and all three, employing the methodology used in APPENDIX B. The neural network classifier was implemented with the MATLAB® fitnet function and ten hidden nodes; the MATLAB® svnmtrain function was used to realize the support vector machine classifier; the MATLAB® ClassificationTree function was employed for the decision tree classifier; bagging was carried out with the MATLAB® fitensemble function making use of 100 decision tree learners; and boosting was achieved with the MATLAB® fitensemble function configured with the AdaBoostM1 booster and 100 decision tree learners. The classifiers were not augmented further than the default parameters for the MATLAB® functions.

The performance of the resulting 35 experiments was measured with three metrics: accuracy, F-measure, and Cohen's kappa (κ). The 35 experiments were conducted four times with different validation methods: 3-fold cross-validation of BURNC, training with BURNC and testing with TIMIT, training with TIMIT and testing with BURNC, and 6-fold cross-validation of a combined corpus of TIMIT and BURNC. The set of prominent syllable detectors could be as large as twelve (three metrics times four validation methods). In previous work the 35 experiments were run with a 5-fold cross-validation of TIMIT, which yielded a single prominent syllable detector for all three metrics (see APPENDIX B).

Similarly, to ascertain a set of tone choice classifiers, the performance of two machine learning classifiers (neural network and boosting ensemble) was quantified in two configurations (multi-class and pairwise coupling) and a rules-based classifier and three sets of features built from the TILT and Bézier pitch contour models and our 4-point pitch contour model utilizing the same experimental methods as found in the paper by Johnson et al. entitled "Automatic Prosodic Tone Choice Classification of Brazil's Intonation Model," filed herewith as APPENDIX D to this document, the disclosure of which is hereby incorporated entirely herein by reference. The MATLAB® patternnet function was used with ten hidden nodes to implement the neural network classifier and the MATLAB® fitensemble function employing the AdaBoostM1 (binary classifier) or AdaBoostM2 (multi-class classifier) booster and 100 decision tree learners (i.e., weak classifiers) to realize the boosting ensembles. The rule-based classifier determined the tone choice based on thresholds of significance vs. insignificance of each rise and fall of a 4-point pitch contour model which resembles a full period of a sine wave as disclosed in APPENDIX D.

Relative observed agreement, Pr(a), and Fless' kappa (κ) were used to quantify the performance of the thirteen experiments. The thirteen experiments were carried out four times with the same validation methods described above for the prominent syllable detectors, which could potentially result in a set of eight tone choice classifiers. However, the thirteen experiments with a 5-fold cross-validation of TIMIT were performed as described in APPENDIX D and they produced a single classifier for both metrics.

The second stage of the experiments utilized the CELA speech corpus. First, all of the prominent syllable detectors (potentially twelve) were tested to establish which one resulted in the best Pearson's correlation between the computer's and humans' proficiency ratings. Then, making use of the best prominent syllable detector, all of the tone choice classifiers (potentially eight) were assessed to ascertain which one led to the best human-computer correlation. Table 4 summarizes how the prominent syllable detectors and tone choice classifiers were tested.

TABLE 4

| How prominent syllable detector/tone choice classifier was identified | How classifier was trained for CELA corpus |
| --- | --- |
| 3-fold cross-validation of BURNC | 144 utterances of BURNC |
| BURNC trained, TIMIT tested | 144 utterances of BURNC |
| TIMIT trained, BURNC tested | 839 utterances of TIMIT |
| 6-fold cross-validation of TIMIT + BURNC | 983 utterances of TIMIT + BURNC |

The prominent syllable detectors and tone choice classifiers were tested in two phases. In the first phase, each prominent syllable detector was evaluated by substituting it into the process of identifying prominent syllables from unconstrained speech described previously. This insertion resulted in new calculations for the 35 suprasegmental measures. The newly calculated suprasegmental measures were then assessed as described below with 17 machine classifiers, which took subsets of the 35 measures as input and outputted the CELA proficiency scores for the 120 speakers in the CELA corpus. The prominent syllable detector which attained the highest correlation between the computer's proficiency scores and the official CELA scores was used again in the process of identifying prominent syllables of the second phase of the experiments. In the second phase, each of tone choice classifiers was exchanged for the process of identifying tone choices discussed previously for unconstrained speech, which again caused new computations for the 35 suprasegmental measures. As with the prominent syllable detectors, the newly computed measures were evaluated to establish the best of 17 machine classifiers which led to the highest correlation between the computer's scores and the official CELA proficiency scores.

For each prominent syllable detector and tone choice classifier, the performance of 17 machine learning ensemble classifiers was tested as depicted in Table 5.

TABLE 5

| Configuration | Ensemble |
| --- | --- |
| Pairwise coupling | AdaBoostM1 |
| Multi-class | AdaBoostM2 |
| Multi-class | Bagging |
| Pairwise coupling | Bagging |
| Pairwise coupling | GentleBoost |
| Pairwise coupling | LogitBoost |
| Multi-class | LPBoost |
| Pairwise coupling | LPBoost |
| Pairwise coupling | RobustBoost |
| Multi-class | RUSBoost |
| Pairwise coupling | RUSBoost |
| Multi-class | Subspace Discriminant |
| Pairwise coupling | Subspace Discriminant |
| Multi-class | Subspace kNN |
| Pairwise coupling | Subspace kNN |
| Multi-class | TotalBoost |
| Pairwise coupling | TotalBoost |

Two classification configurations were used: multi-class and pairwise coupling. Multi-class classifiers decide on 1-of-n selections. Multi-class classifiers may function more poorly than binary classifiers (i.e., 1-of-2 selections). Pairwise coupling is a technique for separating a multi-class problem into several more precise binary classification problems. The bagging ensembles were realized with the MATLAB® TreeBagger function. The pairwise coupling configuration comprised 100 decision tree learners while the multi-class configuration encompassed 1,000. The boosting ensembles (i.e., AdaBoost, LogitBoost, GentleBoost, RobustBoost, LPBoost, TotalBoost, and RUSBoost) employed the MATLAB® fitensemble function with 100 weak learners. There are no functions integrated into MATLAB® for the multi-class configuration of LogitBoost, GentleBoost, or RobustBoost.

A number of trials were done to establish the optimum machine learning classifier and group of suprasegmental measures for assessing the English proficiency of the CELA corpus. For each trial, three-fold cross-validation was applied. Folds of 40 randomly assigned speakers were split equally by proficiency and gender as shown in Table 6. Because of the small number of male CPE speakers only three folds were utilized.

TABLE 6

| | Female | | | | Male | | | |
| --- | --- | --- | --- | --- | --- | --- | --- | --- |
| Fold | CPE | CAE | FCE | PET | CPE | CAE | FCE | PET |
| 1 | 6 | 7 | 7 | 5 | 2 | 4 | 3 | 6 |
| 2 | 5 | 8 | 7 | 6 | 2 | 3 | 4 | 5 |
| 3 | 6 | 8 | 7 | 5 | 1 | 4 | 4 | 5 |

In these experiments, a genetic algorithm was used to select the best set of suprasegmental measures because, as disclosed in APPENDIX A, a genetic algorithm has been found in this situation to outperform two other feature selection algorithms: take-out/add-in and simulated annealing. A generation of the genetic algorithm contained a beginning population of five groups of suprasegmental measures, the crossover of those groups, and the mutation of those groups. The crossover was accomplished by obtaining the intersection and union of each pair of groups, leading to a maximum of 20 groups. (Null sets and duplicate sets were not considered which decreased the quantity of groups from 20). The mutation was achieved by randomly altering, removing, or inserting a measure in the first five sets, ten union sets, and the ten intersection sets, leading to possibly 25 mutated sets. The fitness of each generation (potentially 50 sets) was gauged with the Pearson's correlation between the classifier's proficiency ratings and the official CELA ones. The five with the greatest correlation turned into the beginning population for the next generation. The first generation began with the five best sets of suprasegmental measures from APPENDIX A. For each trial, the genetic algorithm was exercised for 50 generations. The trial was repeated, i.e. another 50 generations, until there was no improvement in correlation between two trials. The first generation of each new trial was the five sets of suprasegmental measures that produced the five highest correlations in the previous trial.

The purpose of these experiments in this example was to explore using BURNC in conjunction with TIMIT to improve the software's ability to automatically score the proficiency of unconstrained speech, i.e., the CELA's spoken responses. The results of each part of the experiment are reported separately. In all the tables, the best metric of performance is bolded. The experiments were divided into two stages. The first stage identified a set of prominent syllable detectors and a set of tone choice classifiers to be used as candidates in the second stage of the experiments to improve the automatic scoring of English proficiency. Table 7 gives the results of identifying the prominent syllable detectors.

TABLE 7

| Validation | Classifier | Features | Acc | F-meas | κ |
|---|---|---|---|---|---|
| 3-fold cross-validation of BURNC | Neural network | duration & pitch | 86.3 | 61.7 | 0.54 |
| 3-fold cross-validation of BURNC | Neural network | duration, intensity, & pitch | 86.4 | 61.0 | 0.53 |
| 3-fold cross-validation of BURNC | Support vector machine | duration & pitch | 82.3 | 63.7 | 0.53 |
| BURNC trained TIMIT tested | Support vector machine | duration & intensity | 79.3 | 70.8 | 0.55 |
| TIMIT trained BURNC tested | Neural network | duration & pitch | 82.3 | 62.4 | 0.51 |
| TIMIT trained BURNC tested | Boosting | duration & pitch | 82.3 | 62.2 | 0.51 |
| 6-fold cross-validation of TIMIT + BURNC | Neural network | duration, intensity, & pitch | 83.4 | 63.1 | 0.53 |
| 6-fold cross-validation of TIMIT + BURNC | Support vector machine | duration & pitch | 77.9 | 63.2 | 0.48 |

The first part of the experiment yielded eight prominent syllable detectors out of a possible twelve (three metrics by four validation methods) to use in the second stage of the experiment with CELA. The first validation method (3-fold cross-validation of BURNC) shown in the first three rows of Table 7 yielded three different machine learning classifier-feature combinations depending on which metric was used to measure the performance of the classifiers. A neural network analyzing the duration and pitch of syllables performed the best (0.54) when considering Cohen's kappa (κ); when utilizing Accuracy as a performance metric, a neural network evaluating duration, intensity, and pitch was the best (86.4); and a support vector machine examining duration and pitch was optimum (63.7) when using the F-measure.

The second validation method of training the classifier with BURNC and testing it with TIMIT showed that a support vector machine analyzing duration and pitch was the best by all three metrics (accuracy, 79.3; F-measure, 70.8; and κ, 0.55). Employing the third validation method of training the classifier with TIMIT and testing it with BURNC revealed that a neural network evaluating duration and pitch produced the best F-measure (62.4) and κ (0.51), while a boosting ensemble examining duration and pitch performed with the best accuracy (82.3). Examining the fourth validation method of 6-fold cross-validation of a combined corpus of TIMIT and BURNC, uncovered that a neural network processing duration, intensity, and pitch is the best, if accuracy (83.4) and κ (0.53) are considered as the performance metrics, but a support vector machine analyzing duration and pitch is optimum if the F-measure (63.2) is considered as the performance metric. The eight prominent syllable detectors shown in Table 7 plus a bagging ensemble of decision tree learners examining pitch, intensity, and duration as features, which was found to be optimum by all three performance measures in previous work with 5-fold cross-validation of TIMIT disclosed in APPENDIX B provides nine candidates for the second stage of the experiments with CELA. Table 8 gives the results of identifying the tone choice classifiers.

TABLE 8

| Validation | Classifier | Features | Pr(a) | κ |
|---|---|---|---|---|
| 3-fold cross-validation of BURNC | Multi-class Boosting | 4-point | 66.1 | 0.63 |
| BURNC trained TIMIT tested | Rules-based | 4-point | 70.4 | 0.68 |
| TIMIT trained BURNC tested | Rules-based | 4-point | 66.6 | 0.64 |
| 6-fold cross-validation of TIMIT + BURNC | Rules-based | 4-point | 71.9 | 0.69 |

The next part of the experiment produced four tone choice classifiers out of a potential of eight (two classifiers by two configurations by two metrics) for examination in the second stage of the experiments. For the tone choice classifiers, both performance metrics were in agreement on the best classifier and set of features for each of the four techniques of validation. For 3-fold cross-validation of BURNC, the best classifier was multi-class boosting with the 4-point model feature (Pr(a), 66.1; κ, 0.63). The rules-based classifier with the 4-point model features was optimum for the other three validation methods: BURNC trained and TIMIT tested (Pr(a), 70.4; κ, 0.68), TIMIT trained and BURNC tested (Pr(a), 66.6; κ, 0.64), and 6-fold cross-validation of TIMIT+BURNC (Pr(a), 71.9; κ, 0.69). The four tone choice classifiers given in Table 8 provide the four tone choice classifier candidates for the second stage of the experiments with CELA.

The second stage of the experiments utilized the CELA corpus. First, the nine prominent syllable detectors discussed above were tested to establish which one resulted in the best Pearson's correlation between the computer's and humans' proficiency ratings. They were tested by using the various detectors during the prominent syllable detection process previously discussed for unconstrained speech. The results of testing for the best prominent syllable detector are given in Table 9.

TABLE 9

| | Prominent Syllable | | | Proficiency | |
|---|---|---|---|---|---|
| Classifier | Features | Training | Classifier | Measures | r |
| Neural network | duration & pitch | BURNC | Pairwise LogitBoost | PCHR RISL RISM NEUL FALL FALM RFAH SYPS ARTI FPLN FRSH | 0.718 |
| Support vector machine | duration & intensity | BURNC | Pairwise TreeBagger | PCHR RISL RISH NEUL NEUH FALH FRSL FRSH OPTH AVNP ARTI FPRT SPRT FPLN TPTH PPLN GIVP | 0.710 |
| Support vector machine | duration & pitch | BURNC | Multi-class TreeBagger | PCHR FALL FALH FRSH RFAM SYPS ARTI FPRT FPLN PARA OPTH TPTH PPLN | 0.700 |
| Neural network | duration & pitch | TIMIT | Pairwise GentleBoost | PCHR RISL RISH NEUL NEUM FALL FALM FALH FRSH PRAN AVPP PHTR SYPS ARTI OPTH RFAM | 0.699 |
| Neural network | duration, intensity, & pitch | BURNC | Pairwise LogitBoost | SPAC RISL RISH NEUH FALL FALH RFAL RFAM RFAH SYPS ARTI RNLN PARA PPLN NEWP GIVP FPRT | 0.687 |
| Boosting | duration & pitch | TIMIT | Pairwise LogitBoost | PCHR RISL RISM NEUH FALL FALM FRSH RFAL PRAN AVPP PHTR SYPS ARTI FPLN OPTH TPTH | 0.685 |
| Support vector machine | duration & pitch | TIMIT + BURNC | Pairwise AdaBoostM1 | SPAC PACE NEUL NEUH FALL FALM PRAN AVNP SYPS ARTI RNLN FPLN PPLN NEWP | 0.683 |
| Neural network | duration, intensity, & pitch | TIMIT + BURNC | Pairwise GentleBoost | RISL RISH NEUL NEUM GIVP FALL FALM FRSH RFAM RFAH PRAN AVNP AVPP SYPS ARTI FPRT OPTH TPTH PPLN NEWP | 0.678 |
| Bagging ensemble | duration, intensity, & pitch | TIMIT | Pairwise GentleBoost | PCHR NEUL NEUH FRSM PRAN SYPS ARTI FPLN OPTH GIVP FALH | 0.677 |

Each row of Table 9 gives the results for the test of one of the nine prominent syllable detectors. The first two columns are the classifier and the features it analyzed to detect the prominent syllables. The third column gives the corpus on which the classifier was trained. The last three columns give the results of the automatic English proficiency test of CELA when the prominent syllable detector was substituted for step five. The last column is the correlation between the proficiency score calculated by the computer using the classifier in column four and the suprasegmental measures in column five and the proficiency score assigned by the CELA examiners. The best prominent syllable detector identified was the neural network classifier applying the duration and pitch features, which had been trained on the BURNC which resulted in a Pearson's correlation of 0.718 between the computers proficiency scores and the official CELA scores.

The final experiment of the second stage was to use the best prominent syllable detector (i.e., neural network with features of duration and pitch trained on BURNC) in the process of identifying prominent syllables and try the four tone choice classifiers, also explained above, in in the process of identifying tone choices to ascertain which one led to the best human-computer CELA proficiency correlation. The end result of assessing the tone choice classifiers on the CELA corpus is provided in Table 10.

TABLE 10

| | Tone Choice | | | Proficiency | |
|---|---|---|---|---|---|
| Classifier | Features | Training | Classifier | Measures | r |
| Multi-class Boosting | 4-point | BURNC | Pairwise LogitBoost | PCHR RISL NEUL NEUH FALM FRSL FRSH RFAL RFAH PRAN AVNP AVPP SYPS ARTI FPRT FPLN OPTH TPTH PPLN | 0.718 |
| Rules-based | 4-point | BURNC | Pairwise LogitBoost | PCHR FALM FRSL FRSH PRAN SYPS ARTI FPLN NEWP | 0.681 |
| Rules-based | 4-point | TIMIT | Pairwise LogitBoost | PCHR RISL RISM NEUL FALL FALM RFAH SYPS ARTI FPLN FRSH | 0.718 |
| Rules-based | 4-point | TIMIT + BURNC | Pairwise RobustBoost | PCHR RISL NEUL NEUH FALM FALH FRSL RFAH PRAN AVNP AVPP SYPS ARTI FPRT SPLN PARA TPTH PPLN NEWP | 0.694 |

The results for the test of one of the four tone choice classifiers are provided in each row of Table 10. The classifier and the features it analyzed to categorize the tone choice are in columns one and two, respectively. The classifier was trained on the corpus listed in column three. The last three columns present the results of the automatic English proficiency test of CELA when the tone choice classifier was used in the process of identifying tone choices. The last column is the correlation between the proficiency score calculated by the computer using the classifier in column four and the suprasegmental measures in column five and the proficiency score assigned by the CELA examiners. The multi-class boosting classifier which had been trained on the BURNC corpus with the 4-point model features was the best tone choice classifier to utilize in the automatic proficiency scoring method implementation. This configuration resulted in a human-computer correlation between the CELA scores of 0.718, which was slightly higher than the 0.718 correlation in Table 9 although they look the same due to rounding error.

By employing the best prominent syllable detector and tone choice classifier, the experimental results showed a system implementation that attained a 0.718 Pearson's correlation with the official CELA's scores, i.e., the human scored proficiency levels using the Pairwise LogitBoost and suprasegmental measures shown in Table 10.

In these experiments, eight "best" prominent syllable detector implementations and four "best" tone choice classifier implementations were identified by training and testing them with different combinations of the TIMIT and BURNC corpora. Then, testing of the "best" prominent syllable detectors and tone choice classifiers with the CELA corpus was performed to determine which combination was the best for a system implementation that focused on automatically scoring the proficiency of unconstrained speech.

Figure 14:
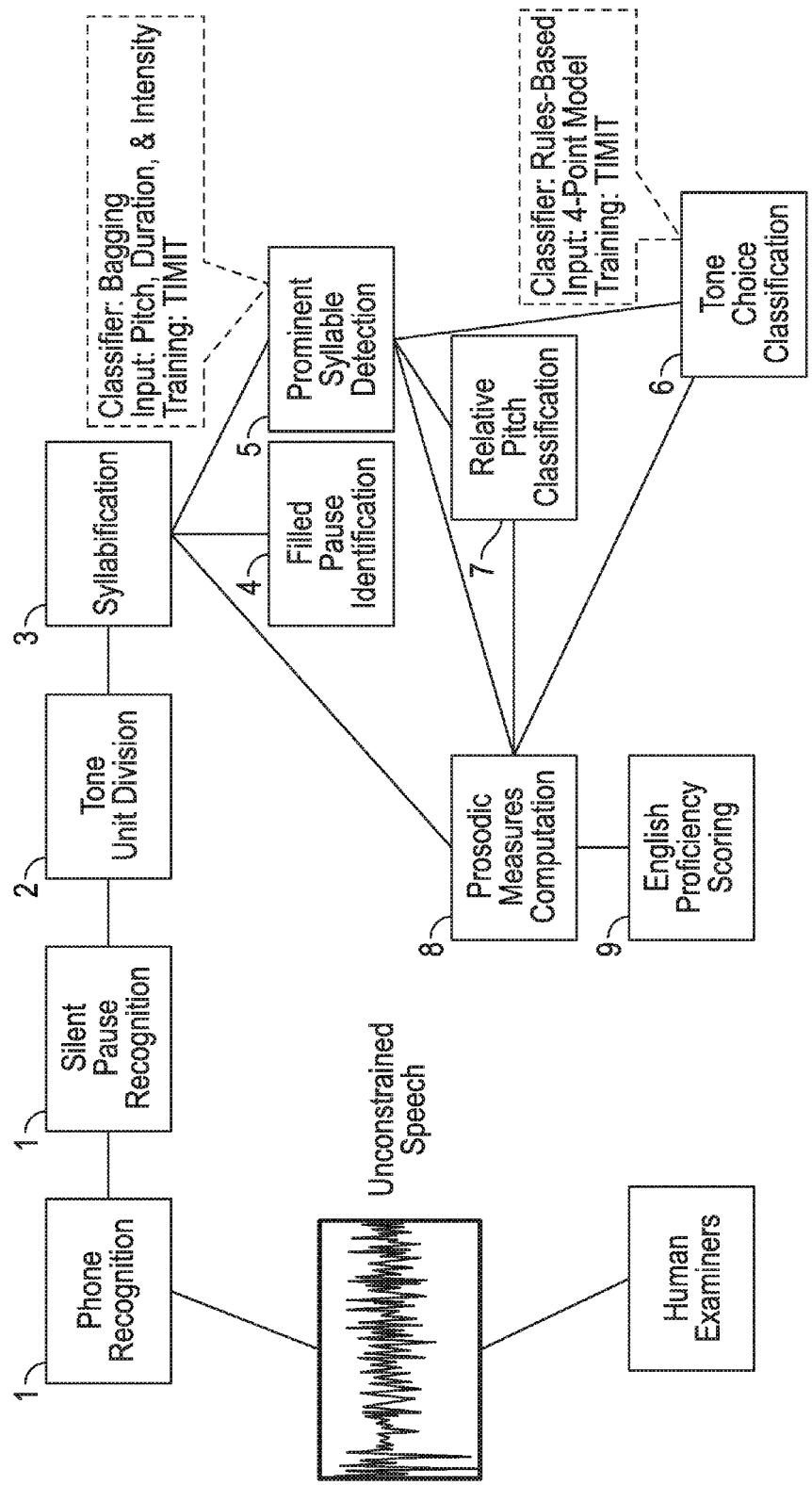
FIG. 14 is a flowchart of a system implementation for scoring proficiency in English disclosed in APPENDIX A.
Figure 15:
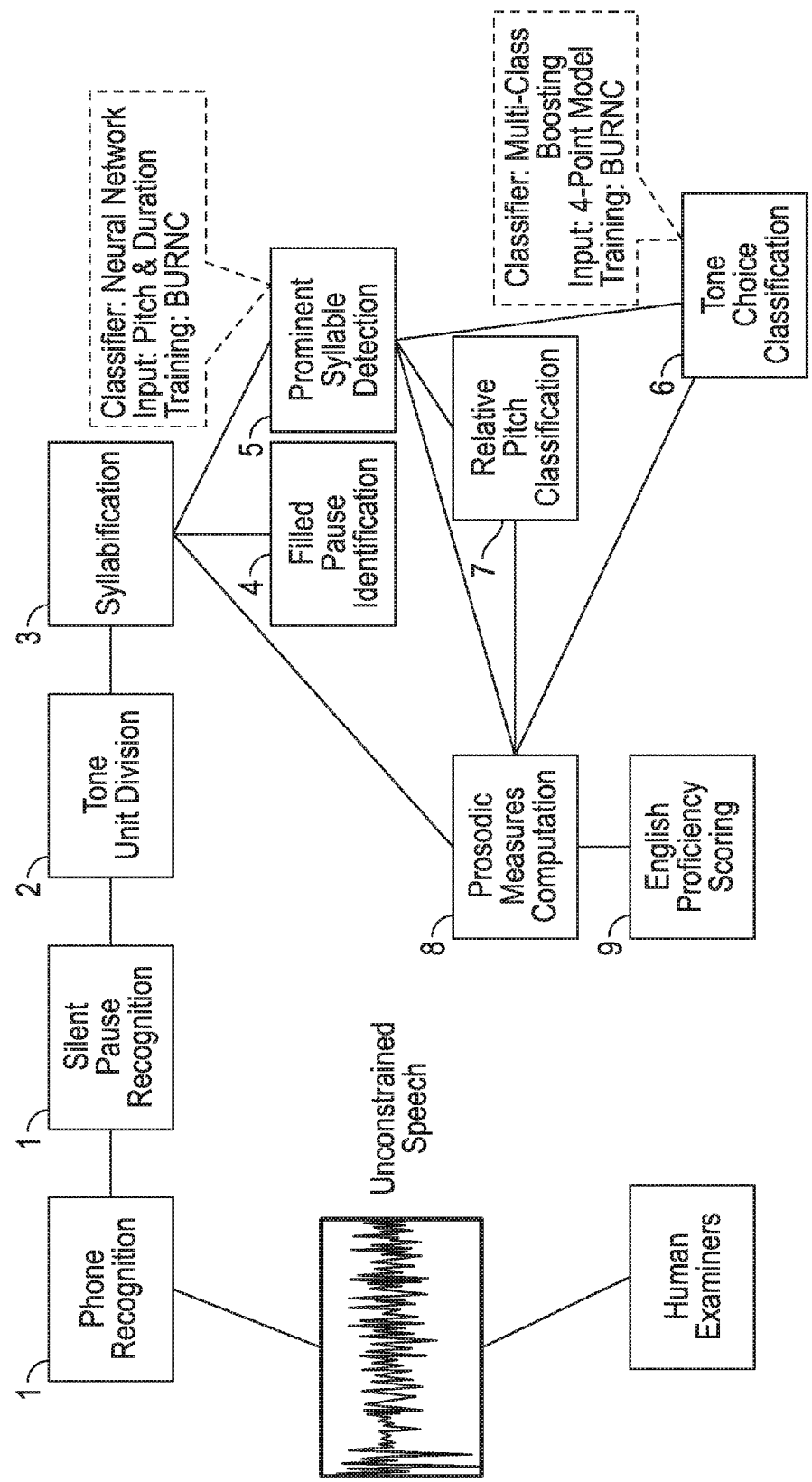
FIG. 15 is a flowchart of a system implementation like those disclosed herein for scoring proficiency in English.

Referring to FIG. 14, a flow chart of the method implementation used in APPENDIX A is illustrated. The numbers in the boxes in FIG. 14 correspond to the nine processes described previously. In APPENDIX A, prominent syllables were detected with a bagging ensemble of 100 decision tree learners, input features of pitch, duration, and intensity features, and training with TIMIT; tone choices were classified with a rule-base classifier, input features based on a 4-point model, and training with TIMIT. For the system and method implementation disclosed in APPENDIX A, the Pearson's correlation between the computer's calculated proficiency scores and those graded by humans was 0.677. The example in this document improved performance, in terms of the Pearson's correlation, from 0.677 to 0.718 by detecting prominent syllables with a neural network classifier, using duration and pitch as input parameters, and training with BURNC and classifying tone choice with multi-class boosting, using input features derived from a 4-point model, and training with BURNC. These results illustrate the effect of using multiple speech corpora to train the classifiers represented in boxes 5 (prominent syllable detection) and 6 (tone choice classification) to improve the human-computer correlation. Referring to FIG. 15, training the classifiers with BURNC instead of TIMIT and using different classifiers and feature sets as shown in FIG. 15 improved the human-computer correlation to 0.718.

An additional example of a system and method implementation demonstrating similar performance may be found in the paper by Johnson et al. entitled "Contribution of Suprasegmental to English Speaking Proficiency: Human Rater and Automated Scoring System," filed herewith as APPENDIX κ, the disclosure of which is hereby incorporated entirely herein by reference.

In other work, not using a speech corpus identical to the CELA corpus, the English proficiency of speakers using unconstrained speech was analyzed in a similar manner and scored from one to four. The human-computer Pearson's correlations reported in those studies ranged from 0.55 to 0.62, well below the results attained. Probably more significant, is to compare the human-computer correlation with that between two human proficiency ratings. In the paper by Zechner et al. entitled "Automatic scoring of non-native spontaneous speech in tests of spoken English," Speech Communication, V. 51, No. 10, p. 883-895 (2009), the disclosure of which is hereby incorporated entirely herein by reference, a human-human correlation of 0.547 was reported in laboratory tests and 0.77 in field tests. In the paper by Evanini et al. entitled "Automated speech scoring for non-native middle school students with multiple task types," INTERSPEECH proceedings (p. 2435-2439) (2013), the disclosure of which is incorporated entirely herein by reference, reported 0.70 with the Picture Narration task. This variability between human raters shows that the method implementations of automatic scoring of unconstrained speech disclosed herein is approaching coming that of human raters in terms of inter-rater reliability.

In various other system and method implementations, additional improved processes that may be employed to generate the other numbers that are used in computing the segmental and suprasegmental measures, specifically: silent pause detection, filled pause detection, tone unit detection, and syllabification. Other implementations may use Brazil's model to automatically score the dialogic facets of English proficiency, as Brazil's theory is particularly robust in explaining the prosody of dialogs. For example, Brazil's model includes pitch concord in a dialog among two people. Pitch concord is matching the relative pitch of the key and termination prominent syllables between two speakers which have been determined may be a powerful gauge of language proficiency in non-native speakers. In such implementations, the 35 suprasegmental measures (or a subset of these or others) disclosed herein would be augmented with interactive suprasegmental measures specific to dialogs. In APPENDIX C, the authors noted that such suprasegmental measures appear to be very well correlated with accentedness and comprehensibility scores as judged by humans. The paper by Kang et al., entitled "Impact of different task types on candidates' speaking performances and interactive features that distinguish between CEFR levels," Cambridge English: Research Notes, Issue 57, pp. 40-49 (August 2014), referred to herein as APPENDIX E, the disclosure of which is hereby incorporated entirely herein by reference also discusses similar issues.

The various system and method implementations disclosed herein may be used in a wide variety of additional applications. For example, pitch concords can be created by applying the models of the tone choices and pitch height disclosed herein created by and used by the system and method implementations. These pitch concords allow the computing system to automatically interpret discourse meanings between two speakers as discussed previously. The models can also be applied to the concepts of key and termination, which connect to larger topical boundaries (i.e., paratones) within a natural discourse as discussed previously. By developing a contrast model between the high key at the beginning of a new section of a discourse and the low termination at the end of a discourse section, the resulting contrast model will help the system be able to better understand speech communication in human discourse, as the contrast models inform the system (and the humans) of the intention of the messages.

In various implementations, method implementations may include using the evaluated prosody models in conjunction with a hidden Markov model (HMM) to combine a segmental acoustic feature analysis of the raw audio data with the syllables from the evaluated prosody to improve automatic speech recognition (ASR) technology, even under noisy condition, using methods and principles disclosed in the paper to Johnson et al., entitled "Comparison of Algorithms to Divide Noisy Phone Sequences into Syllables for Automatic Unconstrained English Speaking Proficiency Scoring," filed herewith as APPENDIX F, the disclosure of which is hereby incorporated entirely herein by reference. In other implementations, the prosody models created by system and method implementations disclosed herein may be utilized by text-to-speech generators to add prosody to the phones generated by an existing speech engine. In various method implementations, the models created may be used to automatically identify each individual speaker in a conversation that includes multiple speakers. In implementations, the evaluated prosody models may be used to verify the identity of a speaker in a conversation. In other implementations, the evaluated prosody models can be used to identify coded messages being transmitted by criminals or terrorists using the prosody of what initially appears to be an innocuous conversation. In particular implementations, law enforcement may use the evaluated prosody models and/or the systems and methods disclosed herein to determine whether someone is telling the truth or lying.

In various implementations, prosody models created by system and method implementations disclosed herein may be added to the text-to-speech capability of a robot to permit the speech to imitate human emotions; similarly, human-computer interactions could be improved by adding prosody to the computer's voice. In the other direction, the robot (or computer) can detect the prosodic cues of the human speaker and use it to better understand a human's speech or emotional states. In some implementations, the evaluated prosody models may be used to correspondingly mechanically change the robot's appearance in ways humans interpret as conveying corresponding emotions.

In still other implementations, the systems and methods disclosed herein may be used to improve the performance of speech analysis mechanisms used in applied linguistics to reduce or eliminate perceptual subjectivity caused through human analysis. In other implementations, the system could be used for early childhood diagnosis of autism. One characteristic of autistic children is that they have difficulty in imitating prosody normally. This characteristic may be detected using the system in autistic children as young as 16-48 months old. Implementations could be used in improving automatic speech scoring systems and advancing computer-aided ESL (English as a Second Language) learning in schools and by individuals on their own.

In places where the description above refers to particular implementations of automated human speech evaluation system and related methods and implementing components, sub-components, methods and sub-methods, it should be readily apparent that a number of modifications may be made without departing from the spirit thereof and that these implementations, implementing components, sub-components, methods and sub-methods may be applied to other automated human speech evaluation system and related methods.

What is claimed is:

1. A system for performing automated proficiency scoring of speech, the system comprising:
   a microphone coupled with a computing device comprising a microprocessor, a memory, and a display operatively coupled together;
   wherein the microphone is configured to receive an audible unconstrained speech utterance from a user whose proficiency in a language is being tested and provide a corresponding audio signal to the computing device; and
   wherein the microprocessor and memory are configured to:
      receive the audio signal; and
      process the audio signal by:
         recognizing a plurality of phones and a plurality of pauses comprised in the audio signal corresponding with the utterance;
         dividing the plurality of phones and plurality of pauses into a plurality of tone units;
         grouping the plurality of phones into a plurality of syllables;
         identifying a plurality of filled pauses from among the plurality of pauses;
         detecting a plurality of prominent syllables from among the plurality of syllables;
         identifying, from among the plurality of prominent syllables, a plurality of tonic syllables;
         identifying a tone choice for each of the tonic syllables of the plurality of tonic syllables to form a plurality of tone choices;
         calculating a relative pitch for each of the tonic syllables of the plurality of tonic syllables to form a plurality of relative pitch values;
         calculating a plurality of suprasegmental parameters using one of the plurality of pauses, the plurality of filled pauses, the plurality of tone units, the plurality of syllables, the plurality of prominent syllables, the plurality of tone choices the plurality of relative pitch values, and any combination thereof;
         using the plurality of suprasegmental parameters, calculating a language proficiency rating for the user; and
         displaying the language proficiency rating of the user on the display associated with the computing device using the microprocessor and the memory.

2. The system of claim 1, wherein recognizing a plurality of phones and a plurality of pauses further comprises recognizing using an automatic speech recognition system (ASR) and the microprocessor wherein the ASR is trained using a speech corpus.

3. The system of claim 2, further comprising identifying a plurality of silent pauses of the plurality of pauses after recognizing using the ASR.

4. The system of claim 3, wherein dividing the plurality of phones and plurality of pauses into a plurality of tone units further comprises using the plurality of silent pauses and one of a plurality of pitch resets and a plurality of slow pace values.

5. The system of claim 1, wherein grouping the plurality of phones into a plurality of syllables further comprises using a predetermined bias value.

6. The system of claim 1, wherein detecting a plurality of prominent syllables from among the plurality of syllables further comprises detecting using a bagging ensemble of decision tree learners, two or more speech corpora, and the microprocessor.

7. The system of claim 1, wherein identifying a tone choice for each of the tonic syllables further comprises identifying using a rule-based classifier comprising a 4-point model, two or more speech corpora, and the microprocessor.

8. The system of claim 1, wherein the plurality of suprasegmental parameters are selected from the group consisting of articulation rate (ARTI), phonation time ratio (PHTR), tone unit mean length (RNLN), syllables per second (SYPS), filled pause mean length (FPLN), filled pauses per second (FPRT), silent pause mean length (SPLN), silent pauses per second (SPRT), prominent syllables per tone unit (PACE), percent of tone units containing at least one prominent syllable (PCHR), percent of syllables that are prominent (SPAC), overall pitch range (PRAN), non-prominent syllable mean pitch (AVNP), prominent syllable mean pitch (AVPP), falling-high rate (FALH), falling-low rate (FALL), falling-mid rate (FALM), fall-rise-high rate (FRSH), fall-rise-low rate (FRSL), fall-rise-mid rate (FRSM), neutral-high rate (NEUH), neutral-low rate (NEUL), neutral-mid rate (NEUM), rise-fall-high rate (RFAH), rise-fall-low rate (RFAL), rise-fall-mid rate (RFAM), rising-high rate (RISH), rising-low rate (RISL), rising-mid rate (RISM), given lexical item mean pitch (GIVP), new lexical item mean pitch (NEWP), paratone boundary onset pitch mean height (OPTH), paratone boundaries per second (PARA), paratone boundary mean pause length (PPLN), paratone boundary mean termination pitch height (TPTH), and any combination thereof.

9. The system of claim 1, wherein calculating the language proficiency rating for the user further comprises calculating using the plurality of suprasegmental parameters and a pairwise coupled ensemble of decision tree learners and the microprocessor.

10. The system of claim 1, wherein the language is English and the language proficiency rating is based on a Cambridge English Language Assessment rating system.

11. A method of performing automated proficiency scoring of speech, the method comprising:
    generating an audio signal using a microphone by receiving an audible unconstrained speech utterance from a user whose proficiency in a language is being tested;
    providing the audio signal to a computing device coupled with the microphone, the computing device comprising a microprocessor, a memory, and a display operatively coupled together;
    processing the audio signal using the microprocessor and memory by:
        recognizing a plurality of phones and a plurality of pauses comprised in the audio signal corresponding with the utterance;
        dividing the plurality of phones and plurality of pauses into a plurality of tone units;
        grouping the plurality of phones into a plurality of syllables;
        identifying a plurality of filled pauses from among the plurality of pauses;
        detecting a plurality of prominent syllables from among the plurality of syllables;
        identifying, from among the plurality of prominent syllables, a plurality of tonic syllables;
        identifying a tone choice for each of the tonic syllables of the plurality of tonic syllables to form a plurality of tone choices;
        calculating a relative pitch for each of the tonic syllables of the plurality of tonic syllables to form a plurality of relative pitch values;
        calculating a plurality of suprasegmental parameters using one of the plurality of pauses, the plurality of filled pauses, the plurality of tone units, the plurality of syllables, the plurality of prominent syllables, the plurality of tone choices, the plurality of relative pitch values, and any combination thereof;
        using the plurality of suprasegmental parameters, calculating a language proficiency rating for the user; and
        displaying the language proficiency rating of the user on the display associated with the computing device using the microprocessor and the memory.

12. The method of claim 11, wherein recognizing a plurality of phones and a plurality of pauses further comprises recognizing using an automatic speech recognition system (ASR) and the microprocessor wherein the ASR is trained using a speech corpus.

13. The method of claim 12, further comprising identifying a plurality of silent pauses of the plurality of pauses after recognizing using the ASR.

14. The method of claim 13, wherein dividing the plurality of phones and plurality of pauses into a plurality of tone units further comprises using the plurality of silent pauses and one of a plurality of pitch resets and a plurality of slow pace values.

15. The method of claim 11, wherein detecting a plurality of prominent syllables from among the plurality of syllables further comprises detecting using a bagging ensemble of decision tree learners, two or more speech corpora, and the microprocessor.

16. The method of claim 11, wherein identifying a tone choice for each of the tonic syllables further comprises identifying using a rule-based classifier comprising a 4-point model, two or more speech corpora, and the microprocessor.

17. The system of claim 11, wherein the plurality of suprasegmental parameters are selected from the group consisting of articulation rate (ARTI), phonation time ratio (PHTR), tone unit mean length (RNLN), syllables per second (SYPS), filled pause mean length (FPLN), filled pauses per second (FPRT), silent pause mean length (SPLN), silent pauses per second (SPRT), prominent syllables per tone unit (PACE), percent of tone units containing at least one prominent syllable (PCHR), percent of syllables that are prominent (SPAC), overall pitch range (PRAN), non-prominent syllable mean pitch (AVNP), prominent syllable mean pitch (AVPP), falling-high rate (FALH), falling-low rate (FALL), falling-mid rate (FALM), fall-rise-high rate (FRSH), fall-rise-low rate (FRSL), fall-rise-mid rate (FRSM), neutral-high rate (NEUH), neutral-low rate (NEUL), neutral-mid rate (NEUM), rise-fall-high rate (RFAH), rise-fall-low rate (RFAL), rise-fall-mid rate (RFAM), rising-high rate (RISH), rising-low rate (RISL), rising-mid rate (RISM), given lexical item mean pitch (GIVP), new lexical item mean pitch (NEWP), paratone boundary onset pitch mean height (OPTH), paratone boundaries per second (PARA), paratone boundary mean pause length (PPLN), paratone boundary mean termination pitch height (TPTH), and any combination thereof.

18. The system of claim 11, wherein calculating a language proficiency rating for the user further comprises calculating using the plurality of suprasegmental parameters and a pairwise coupled ensemble of decision tree learners and the microprocessor.

19. The system of claim 11, wherein the language is English and the language proficiency rating is based on a Cambridge English Language Assessment rating system.

20. A method of calculating a plurality of suprasegmental values for an utterance, the method comprising:
    generating an audio signal using a microphone by receiving an audible unconstrained speech utterance from a user;
    providing the audio signal to a computing device coupled with the microphone, the computing device comprising a microprocessor, a memory, and a display operatively coupled together;
    processing the audio signal using the microprocessor and memory by:
        recognizing a plurality of phones and a plurality of pauses comprised in the audio signal corresponding with the utterance;
        dividing the plurality of phones and plurality of pauses into a plurality of tone units;
        grouping the plurality of phones into a plurality of syllables;
        identifying a plurality of filled pauses from among the plurality of pauses;
        detecting a plurality of prominent syllables from among the plurality of syllables;

identifying, from among the plurality of prominent syllables, a plurality of tonic syllables;
identifying a tone choice for each of the tonic syllables of the plurality of tonic syllables to form a plurality of tone choices;
calculating a relative pitch for each of the tonic syllables of the plurality of tonic syllables to form a plurality of relative pitch values; and
calculating a plurality of suprasegmental parameters using one of the plurality of pauses, the plurality of filled pauses, the plurality of tone units, the plurality of syllables, the plurality of prominent syllables, the plurality of tone choices, the plurality of relative pitch values, and any combination thereof.

* * * * *

UNITED STATES PATENT AND TRADEMARK OFFICE
CERTIFICATE OF CORRECTION

PATENT NO. : 9,947,322 B2
APPLICATION NO. : 15/054128
DATED : April 17, 2018
INVENTOR(S) : Okim Kang and David O. Johnson It is certified that error appears in the above-identified patent and that said Letters Patent is hereby corrected as shown below:

In the Specification

Column 4, Line 65, delete "of the bias value b"; insert --of the bias value *b*--

Column 10, Line 37, delete "is the tone unit."; insert --is the *tone unit*.--

Column 10, Line 42, delete "more prominent syllables, which"; insert --more *prominent syllables,* which--

Column 10, Line 58, delete "the relative pitch of"; insert --the *relative pitch* of--

Column 10, Line 62, delete "tone choices: falling,"; insert --*tone choices*: falling,--

Column 12, Line 21, delete "Model." English Linguistics Research, V."; insert --Model." *English Linguistics Research*, V.--

Column 12, Line 32, delete "phones f, k, t, n, and epi happening"; insert --phones *f, k, t, n,* and *epi* happening--

Column 12, Line 33, delete "short pau phone (i.e., a pau less"; insert --short *pau* phone (i.e., a *pau* less--

Column 12, Line 34, delete "apau, 2)"; insert --a *pau*, 2)--

Column 12, Line 35, delete "long pau phones (i.e., a pau longer'"; insert --long *pau* phones (i.e., a *pau* longer--

Column 12, Line 36, delete "single pau, 3) merging adjacent pau phones'"; insert --single *pau*, 3) merging adjacent *pau* phones--

Signed and Sealed this
Nineteenth Day of June, 2018

Andrei Iancu
*Director of the United States Patent and Trademark Office*

CERTIFICATE OF CORRECTION (continued)
U.S. Pat. No. 9,947,322 B2

Column 12, Line 37, delete "pau, and/or 4) substituting high intensity pau phones'"; insert --*pau*, and/or 4) substituting high intensity *pau* phones--

Column 12, Line 51, delete "pauses (pan) in"; insert --pauses (*pau*) in--

Column 12, Line 62, delete "pau is high"; insert --*pau* is high--

Column 12, Line 65, delete "after the pau are"; insert --after the *pau* are--

Column 13, Line 3, delete "pauses (pan) corresponding"; insert --pauses (*pau*) corresponding--

Column 13, Lines 19-21, delete "are: aa, ae, ah, ao, aw, ar, ax-h, axr, ay, eh, el, em, en, er, ey, ih, iy, ix, ow, oy, uh, uw, and ux."; insert --are: *aa, ae, ah, ao, aw, ar, ax-h, axr, ay, eh, el, em, en, er, ey, ih, iy, ix, ow, oy, uh, uw,* and *ux*.--

Column 13, Line 26, delete "value, b, where b>0."; insert --value, *b*, where $b > 0$.--

Column 13, Line 32, delete "bias value b"; insert --bias value *b*--

Column 13, Line 33, delete "the bias b was"; insert --the bias *b* was--

Column 13, Line 38, delete "error (e) is the"; insert --error (*e*) is the--

Column 13, Line 41, delete "that with b set"; insert --that with *b* set--

Column 13, Line 42, delete "value of 1.643, e for the"; insert --value of 1.643, *e* for the--

Column 13, Lines 52-53, delete "the set of {ah, arr, er, em, m, w_el, ax, aa_hh} is"; insert --the set of {*ah, axr, er, em, m, w_el, ax, aa_hh*} is--

Column 13, Line 56, delete "aa_hh is the syllable"; insert --*aa_hh* is the syllable--

Column 14, Line 2, delete "duration (d), and/or"; insert --duration (*d*), and/or--

Column 14, Line 3, delete "the intensity (i). The"; insert --the intensity (*i*). The--

Column 14, Line 10, delete "fitensemble function using"; insert --*fitensemble* function using--

Column 14, Line 12, delete "of 95.9%+0.2%, and"; insert --of 95.9%±0.2%, and--

Column 15, Line 10, delete "edness," System, V. 38,"; insert --edness," *System*, V. 38,--

Column 15, Line 62, delete "the MATLABfitensemble function"; insert --the MATLAB *fitensemble* function--

CERTIFICATE OF CORRECTION (continued)
U.S. Pat. No. 9,947,322 B2

Column 18, Line 27, delete "the MATLAB® fitnet func-"; insert --the MATLAB® *fitnet* func- --

Column 18, Line 28, delete "the MATLAB® svnmtrain func-"; insert --the MATLAB® *svnmtrain* func- --

Column 18, Line 30, delete "the MATLAB® ClassificationTree function"; insert --the MATLAB® *ClassificationTree* function--

Column 18, Line 32, delete "the MATLAB® fitensemble function"; insert --the MATLAB® *fitensemble* function--

Column 18, Line 34, delete "the MATLAB® fitensemble function"; insert --the MATLAB® *fitensemble* function--

Column 18, Line 60, delete "the MATLAB® patternnet function"; insert --the MATLAB® *patternnet* function--

Column 18, Line 62, delete "the MATLAB® fitensemble function"; insert --the MATLAB® *fitensemble* function--

Column 19, Line 4, delete "agreement, Pr(a), and"; insert --agreement, *Pr(a)*, and--

Column 20, Line 25, delete "LAB® TreeBagger function."; insert --LAB® *TreeBagger* function.--

Column 20, Line 30, delete "the MATLAB® fitensemble function"; insert --the MATLAB® *fitensemble* function--

Column 22, Line 49, delete "feature (Pr(a), 66.1;"; insert --feature *(Pr(a)*, 66.1;--

Column 22, Lines 51-52, delete "TIMIT tested (Pr(a), 70.4; κ, 0.68), TIMIT trained and BURNC tested (Pr(a),"; insert --TIMIT tested *(Pr(a)*, 70.4; κ, 0.68), TIMIT trained and BURNC tested *(Pr(a)*,--

Column 22, Line 54, delete "BURNC (Pr(a), 71.9;"; insert --BURNC *(Pr(a)*, 71.9;--

Column 25, Lines 60-61, delete "English," Speech Communication, V. 51,"; insert --English," *Speech Communication*, V. 51,--

Column 25, Line 67, delete "INTERSPEECH proceedings"; insert --*INTERSPEECH* proceedings--

Column 26, Lines 28-29, delete "CEFR Levels," Cambridge English: Research Notes, Issue 57,"; insert --CEFR Levels," *Cambridge English: Research Notes*, Issue 57,--

In the Claims

Column 28, Claim 1, Line 17, delete "choices the plurality"; insert --choices, the plurality--